(12) United States Patent  
Friedlander et al.

(10) Patent No.: US 9,229,604 B2  
(45) Date of Patent: Jan. 5, 2016

(54) USER INTERFACE ELEMENT

(75) Inventors: Steven Friedlander, San Diego, CA (US); David Young, San Diego, CA (US)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 13/224,188

(22) Filed: Sep. 1, 2011

(65) Prior Publication Data

US 2013/0061170 A1    Mar. 7, 2013

(51) Int. Cl.
G06F 3/048    (2013.01)
G06F 3/0488   (2013.01)

(52) U.S. Cl.
CPC ............. G06F 3/048 (2013.01); G06F 3/0488 (2013.01)

(58) Field of Classification Search
CPC ...................................................... G06F 3/048
USPC .......................................... 715/800, 888, 81
See application file for complete search history.

(56) References Cited

U.S. PATENT DOCUMENTS

| 6,310,631 | B1* | 10/2001 | Cecco et al. ............. 715/792 |
| 7,760,187 | B2  | 7/2010  | Kennedy |
| 8,159,469 | B2* | 4/2012  | Shiplacoff et al. ......... 345/173 |
| 8,516,365 | B2* | 8/2013  | Hoyer et al. .............. 715/253 |
| 2003/0020671 | A1* | 1/2003 | Santoro et al. .............. 345/1.3 |
| 2005/0076295 | A1* | 4/2005 | Simske et al. ............. 715/517 |
| 2005/0223069 | A1* | 10/2005 | Cooperman et al. ......... 709/206 |
| 2008/0024459 | A1  | 1/2008 | Poupyrev |
| 2009/0070711 | A1* | 3/2009 | Kwak et al. .............. 715/829 |
| 2009/0292989 | A1  | 11/2009 | Matthews |
| 2011/0090255 | A1* | 4/2011 | Wilson et al. ............. 345/647 |
| 2011/0202834 | A1* | 8/2011 | Mandryk et al. ........... 715/701 |

* cited by examiner

*Primary Examiner* — William Bashore  
*Assistant Examiner* — Jeanette J Parker  
(74) *Attorney, Agent, or Firm* — Fitch, Even, Tabin & Flannery LLP

(57) ABSTRACT

Methods and apparatus for providing a user interface for an electronic device are described. Described embodiments include methods and apparatus for generating a user interface element, expanding a user interface element, transitioning subject information in a user interface element, and removing a user interface element.

26 Claims, 40 Drawing Sheets

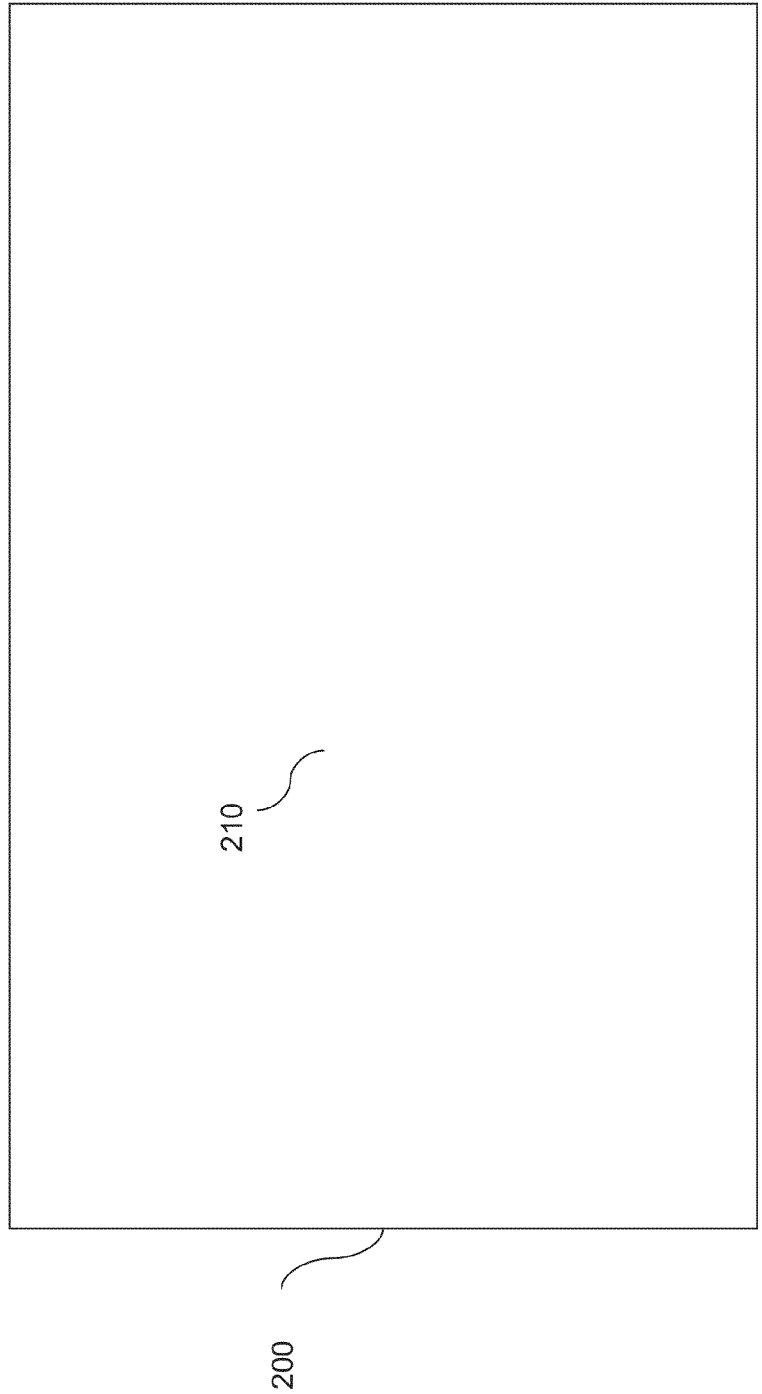

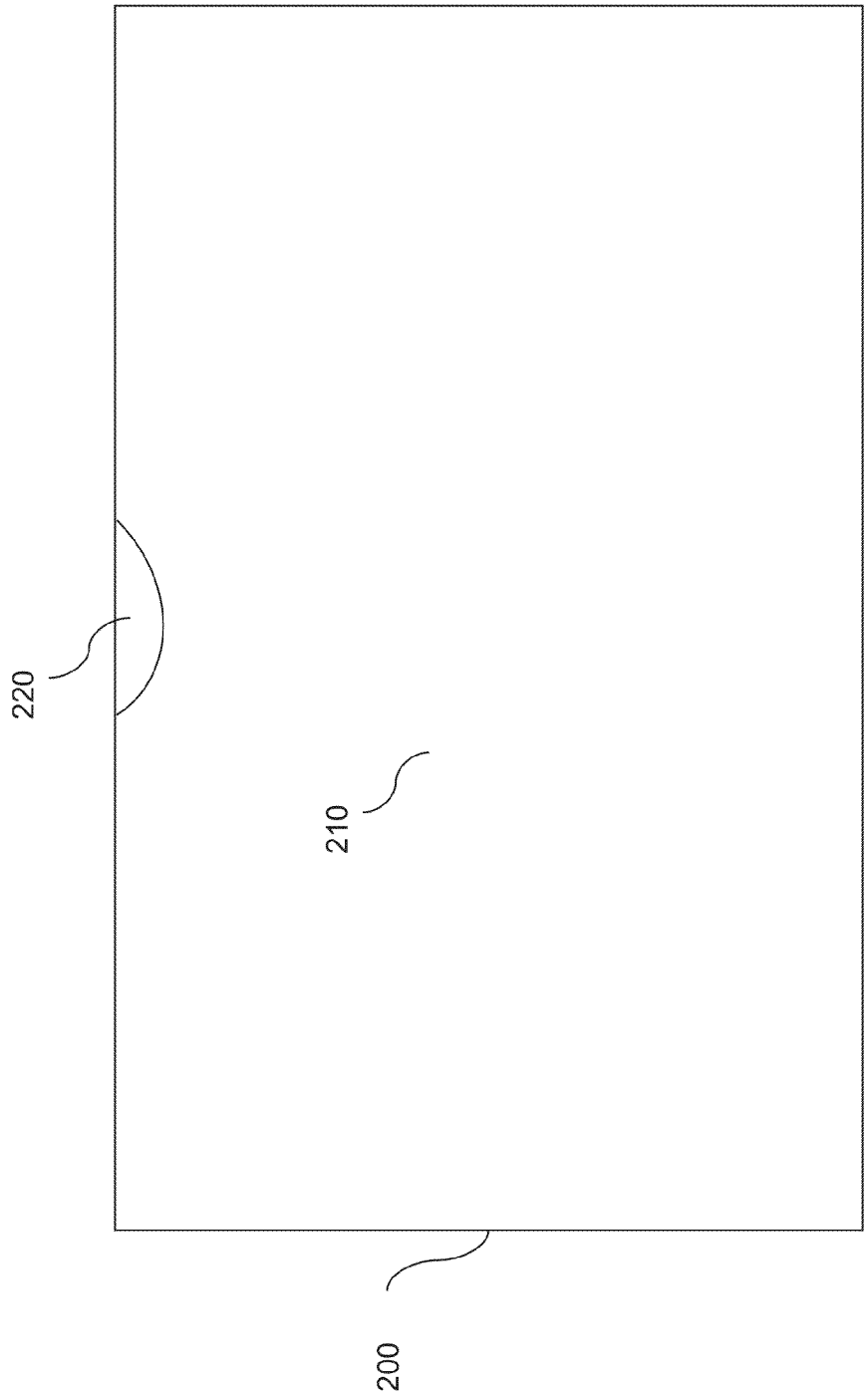

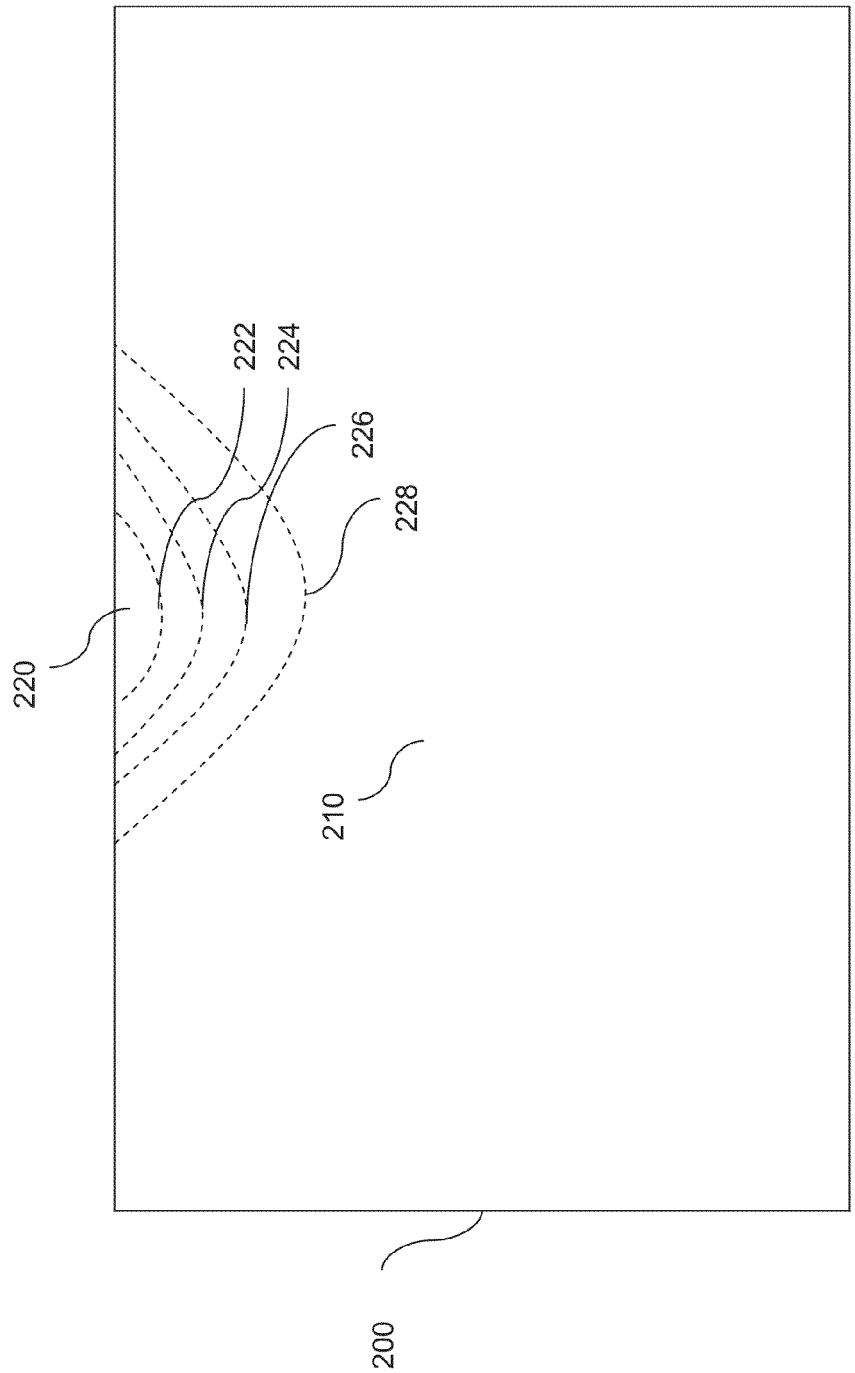

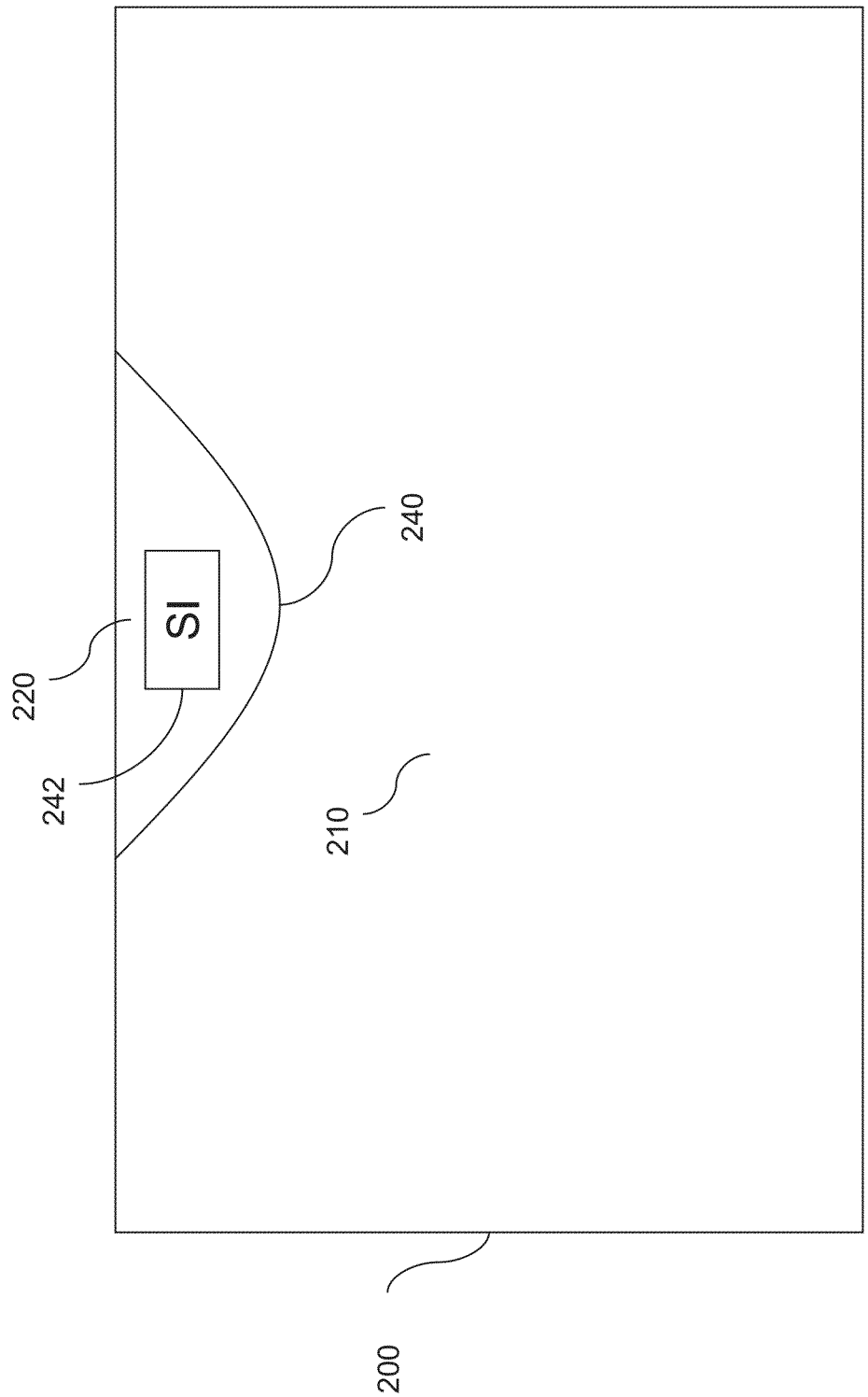

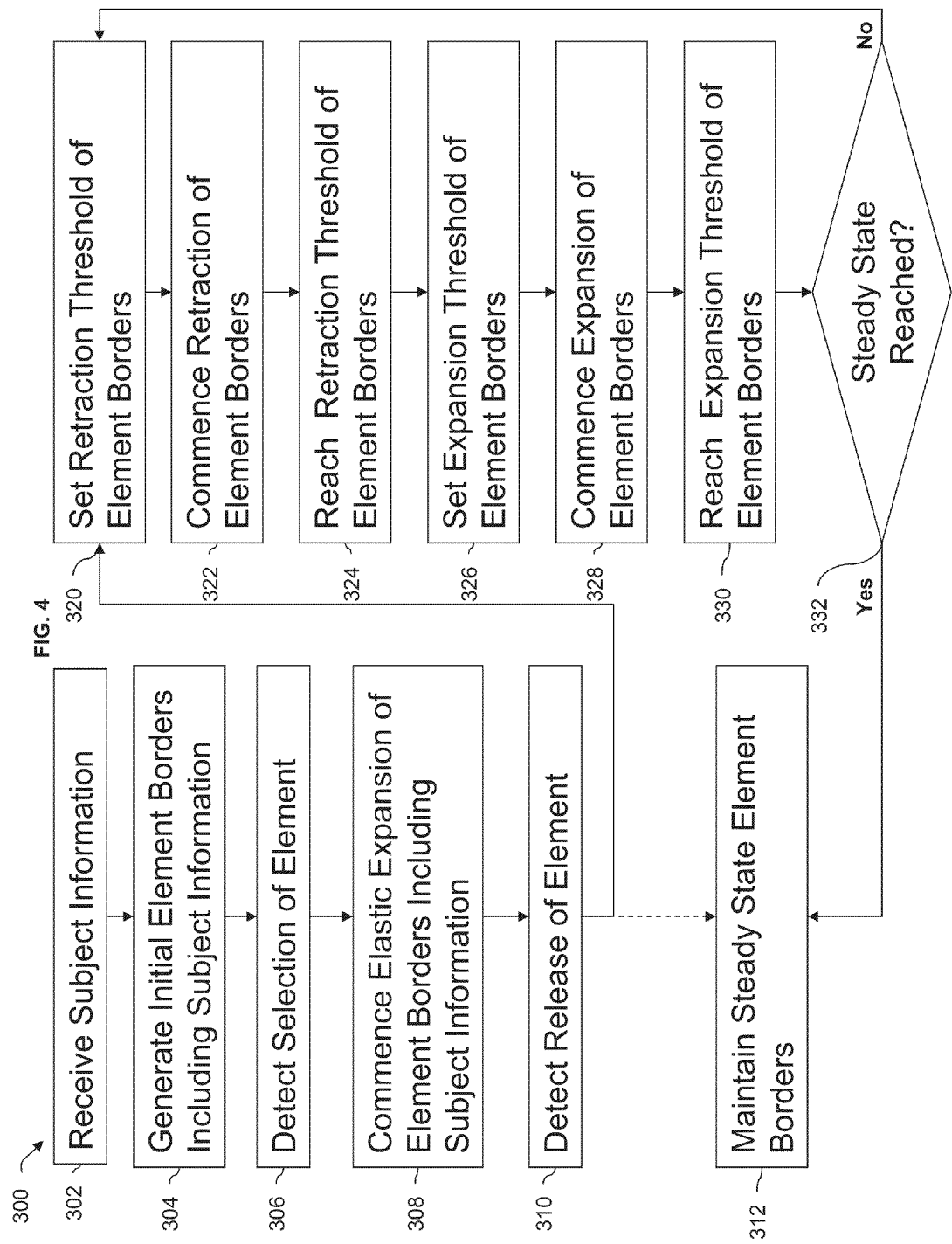

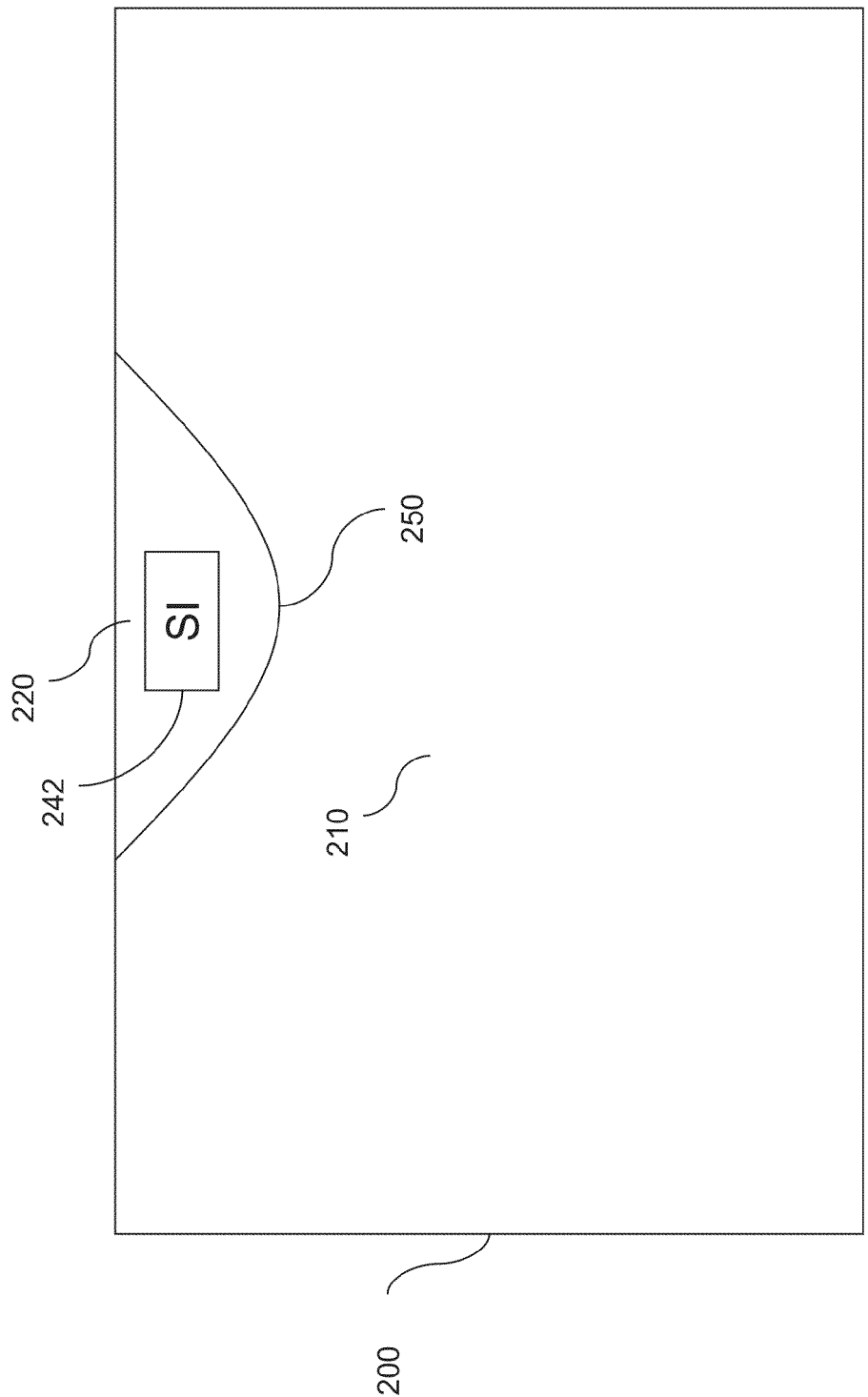

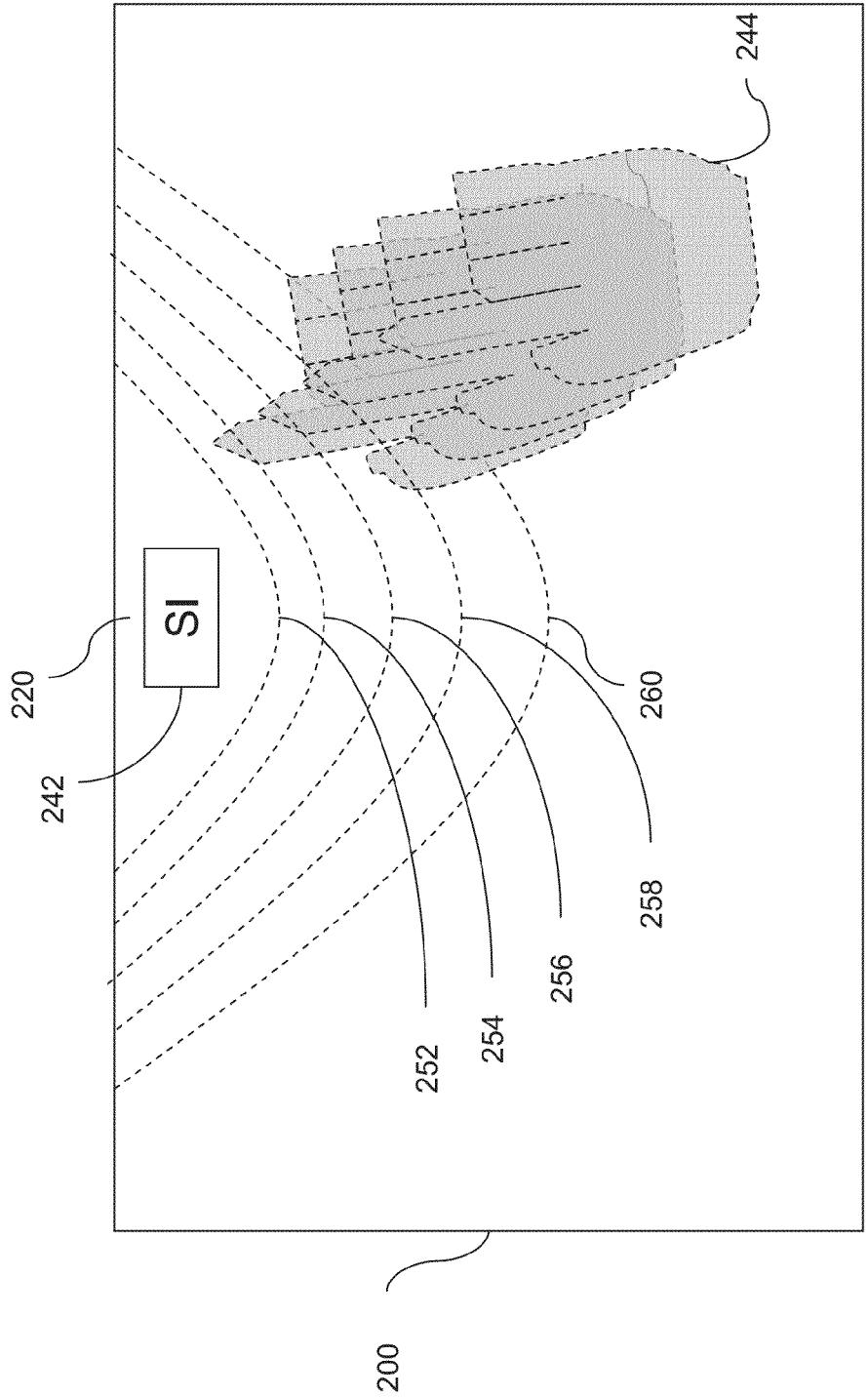

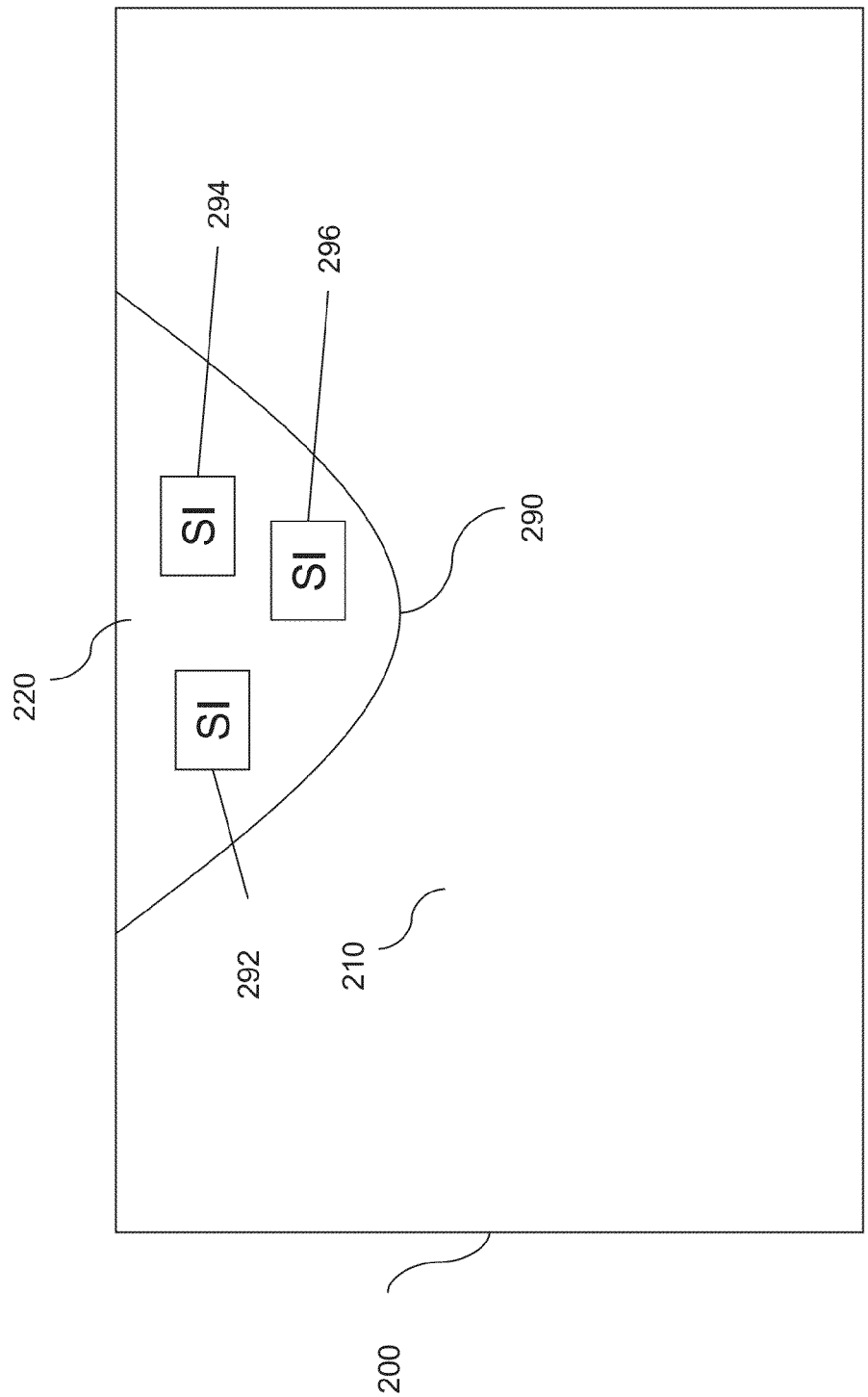

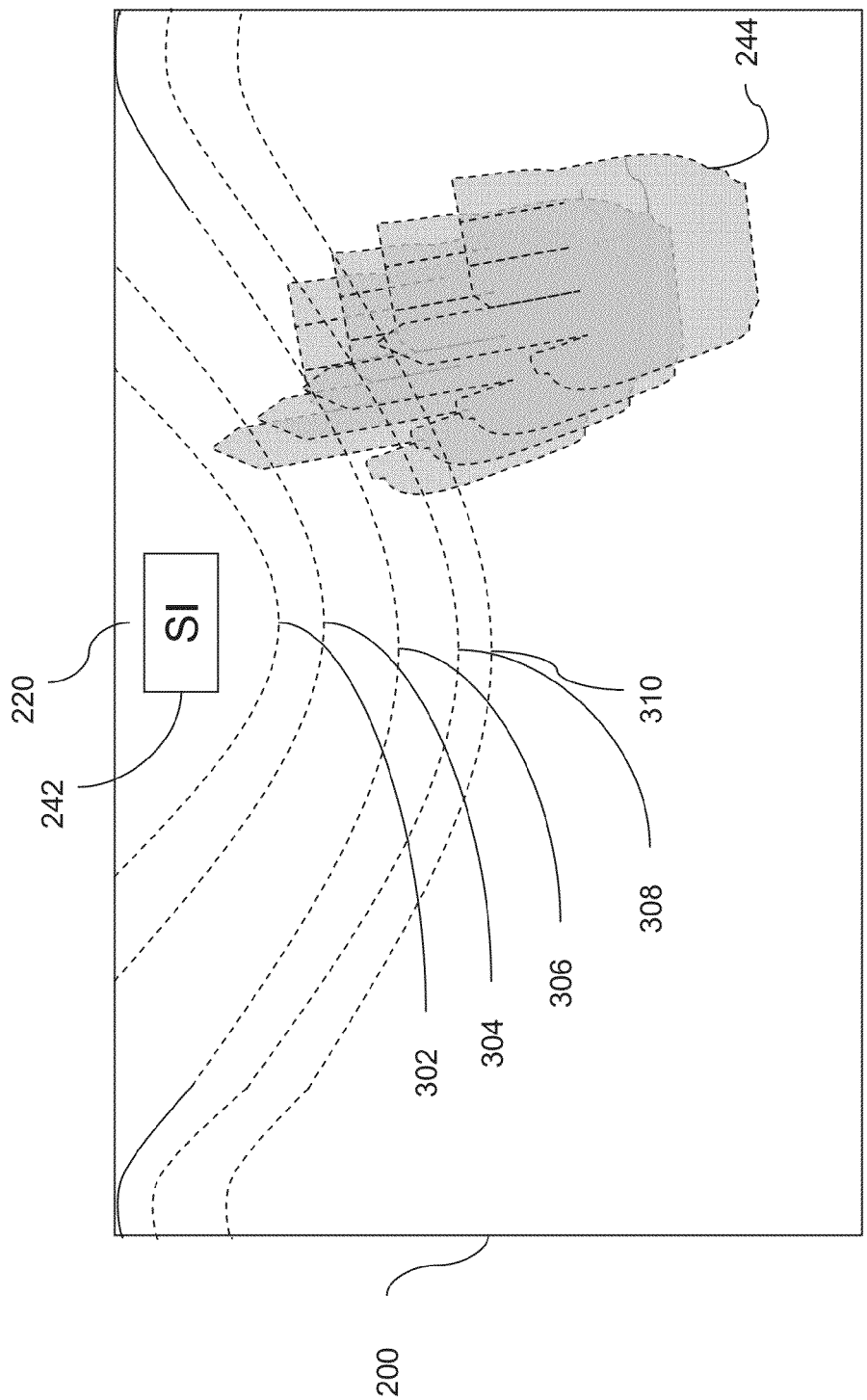

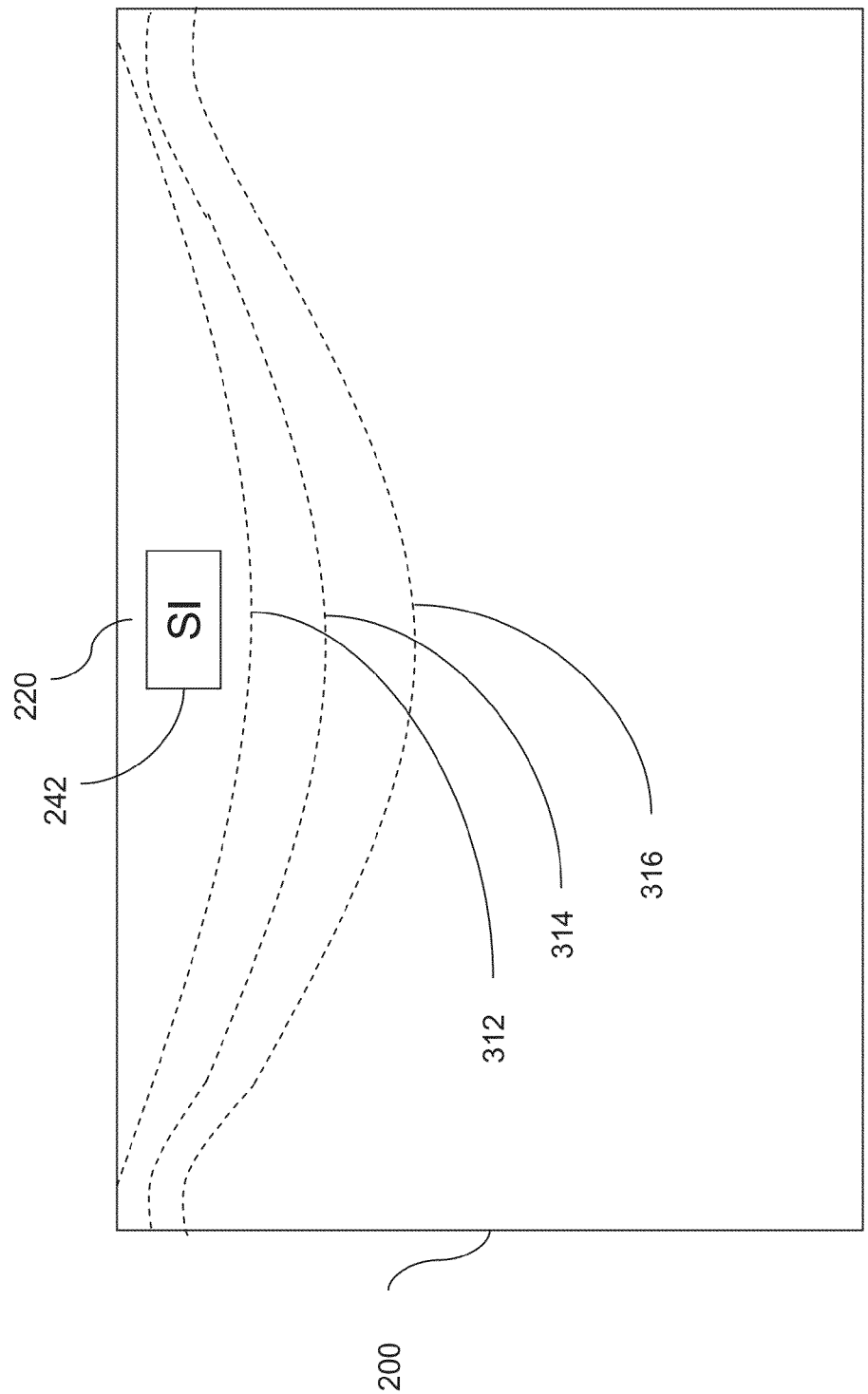

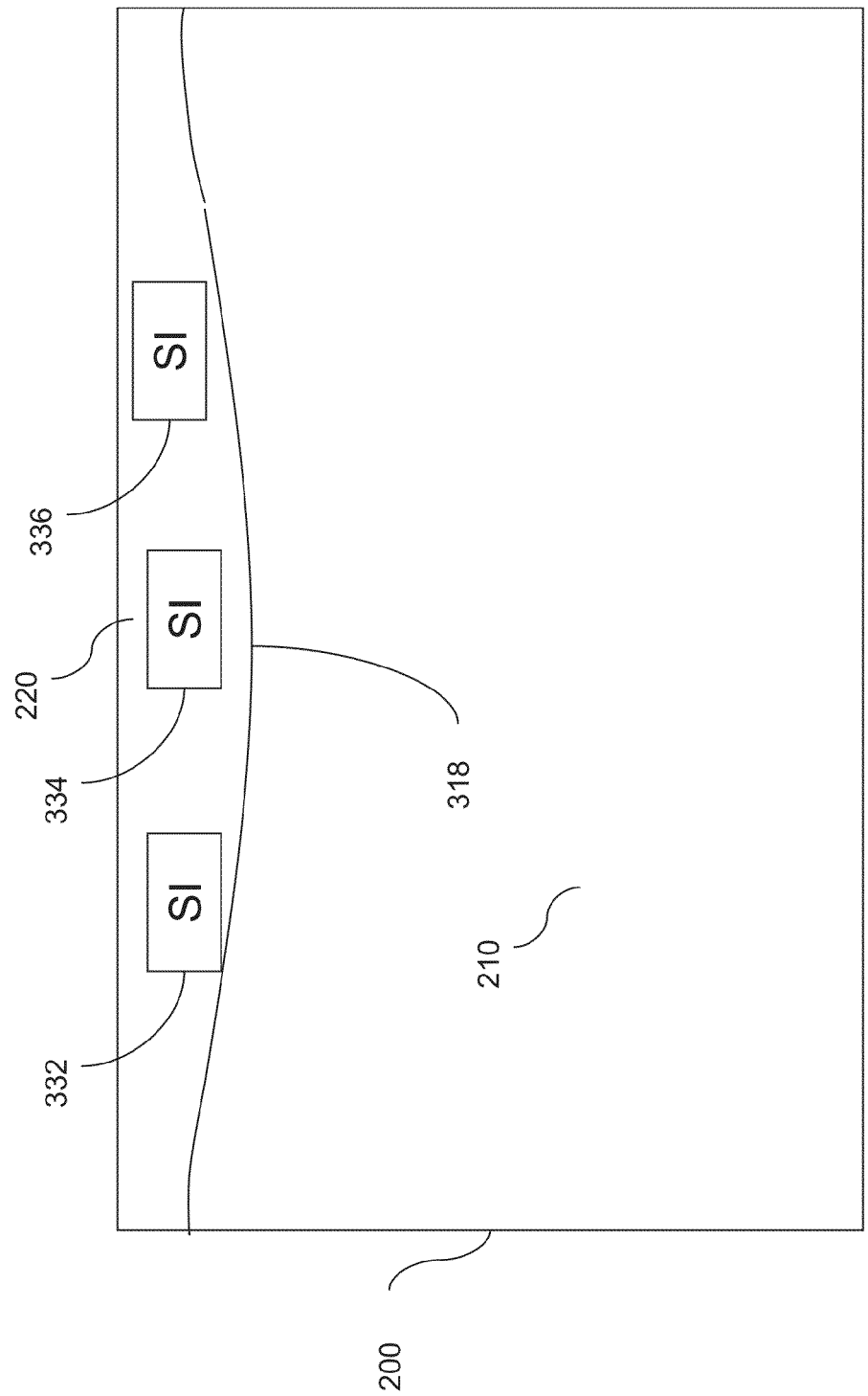

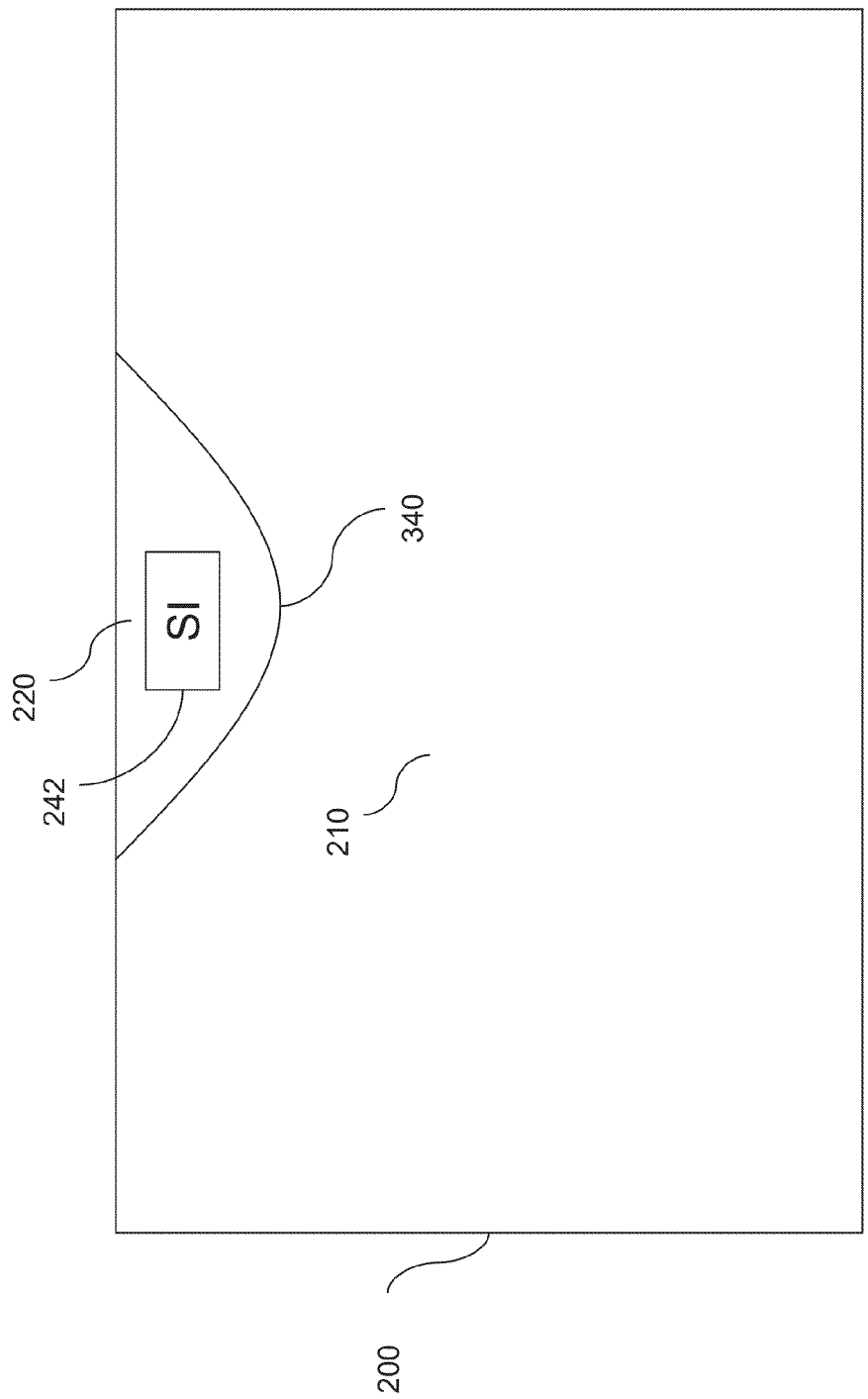

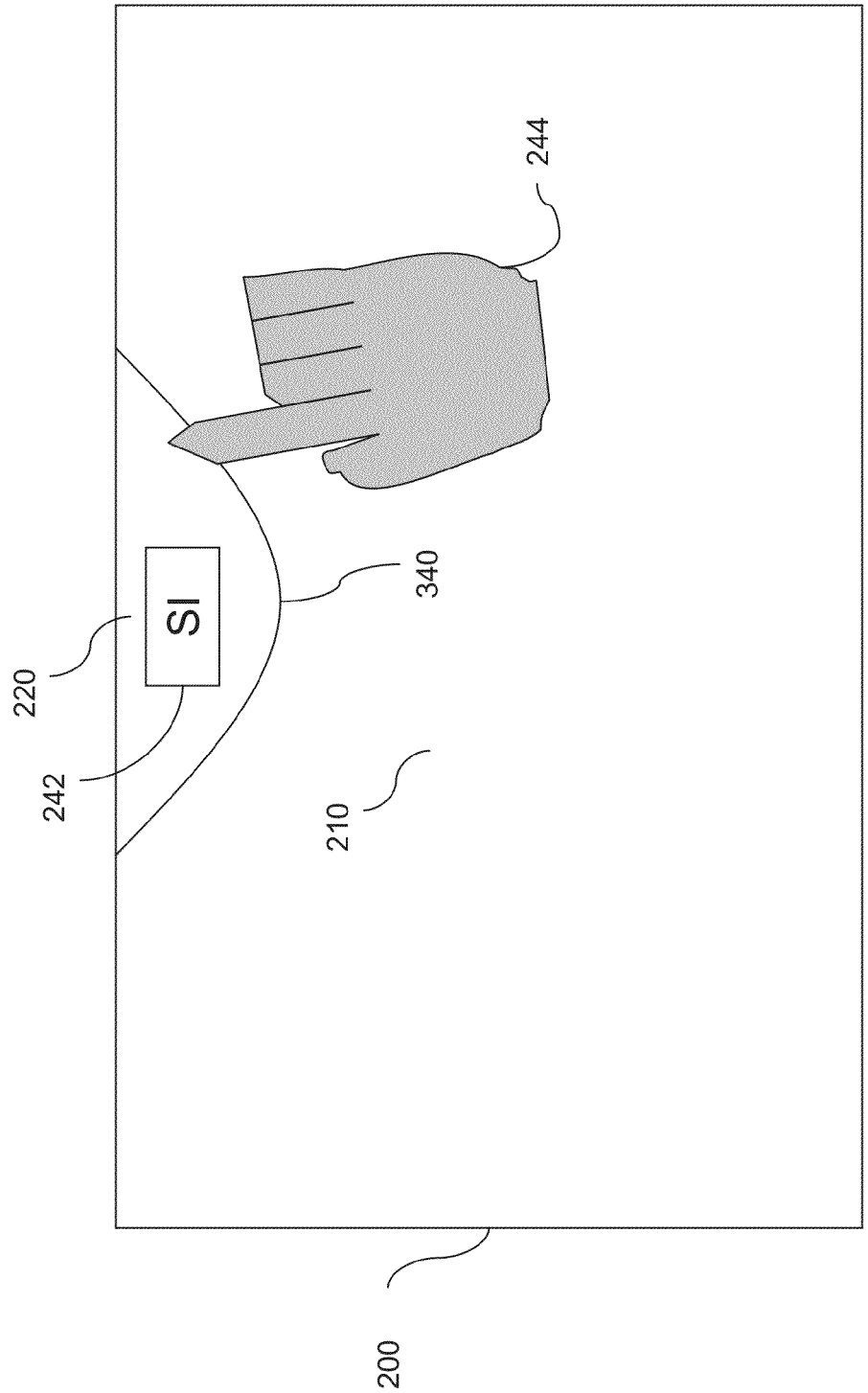

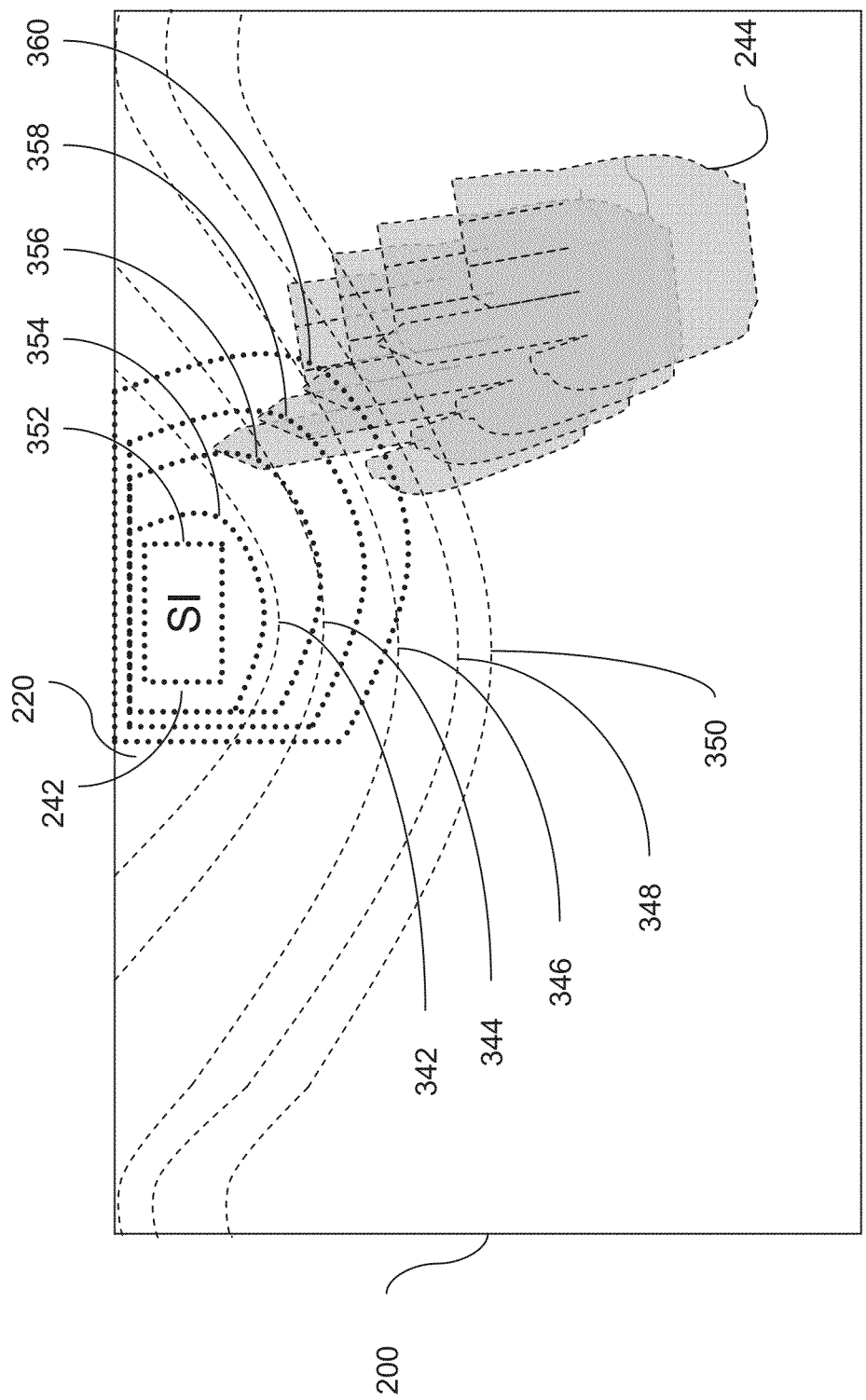

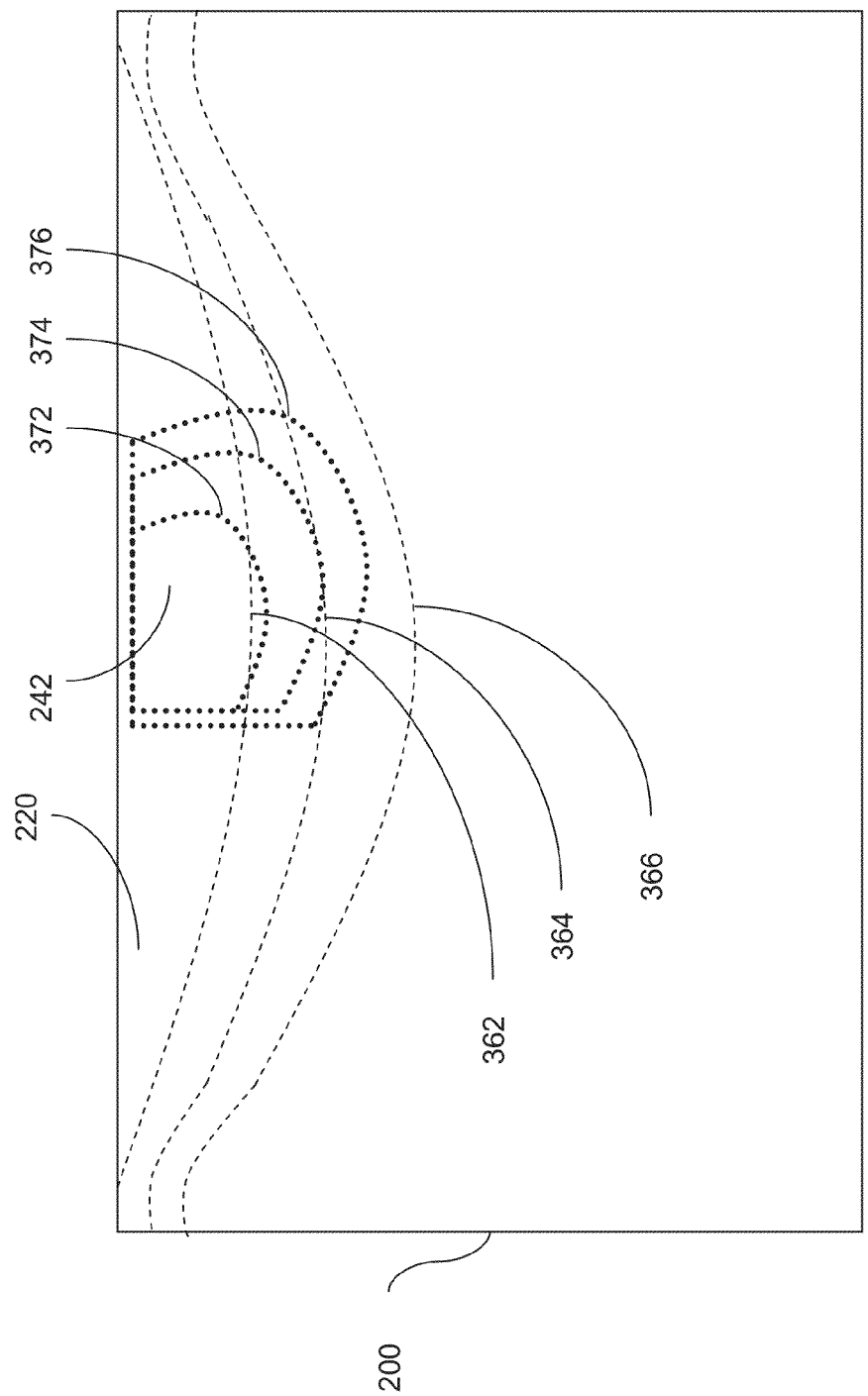

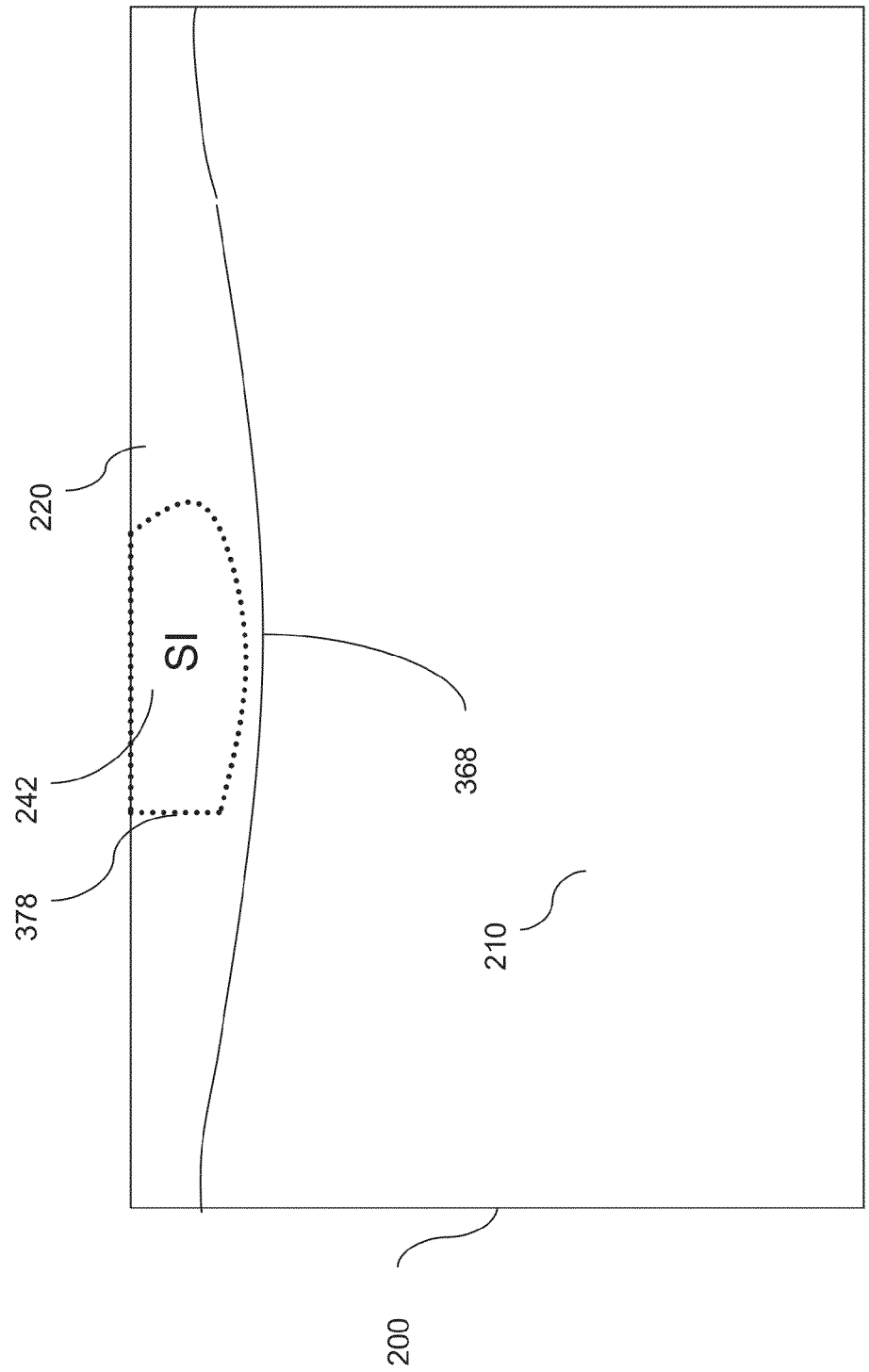

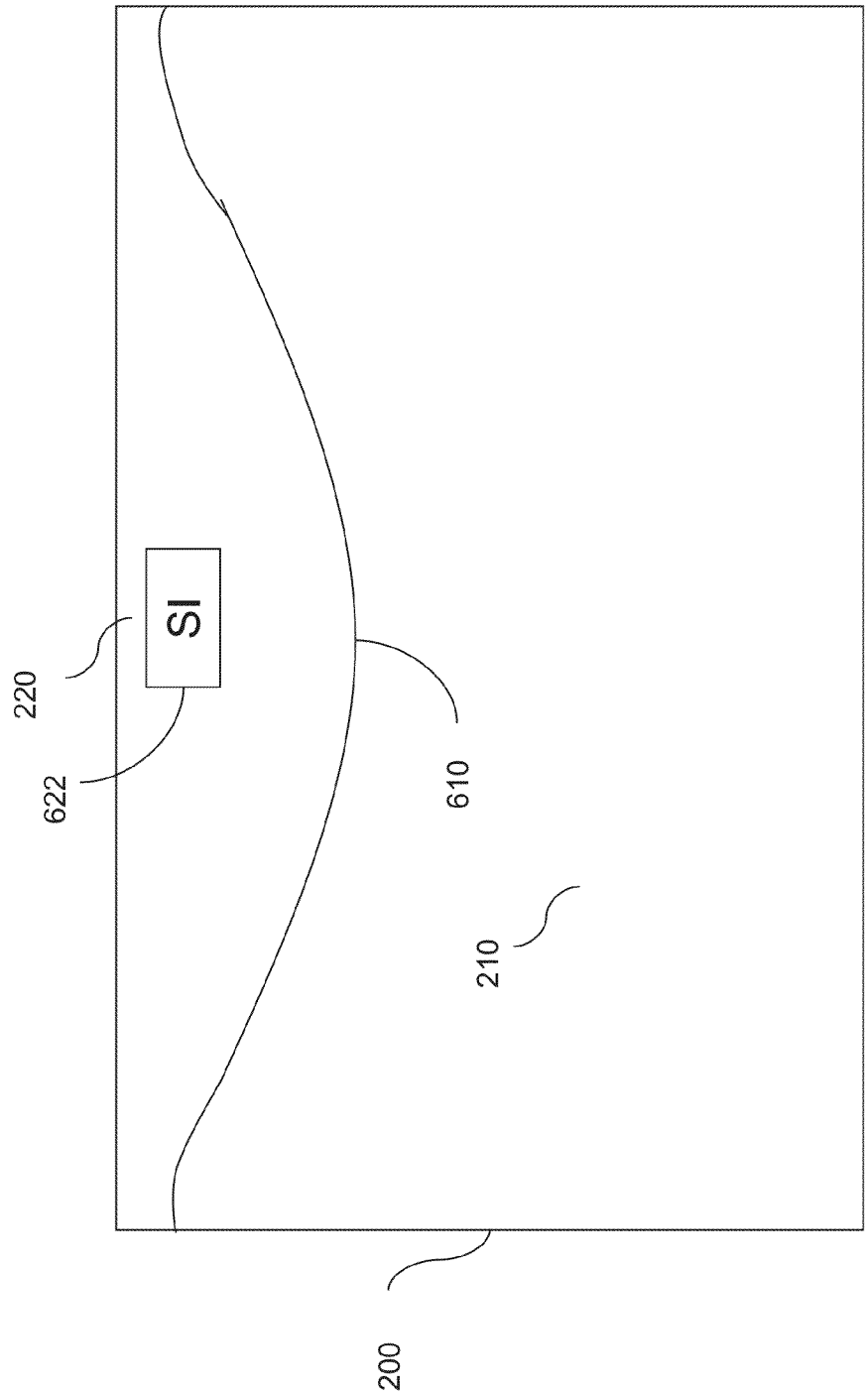

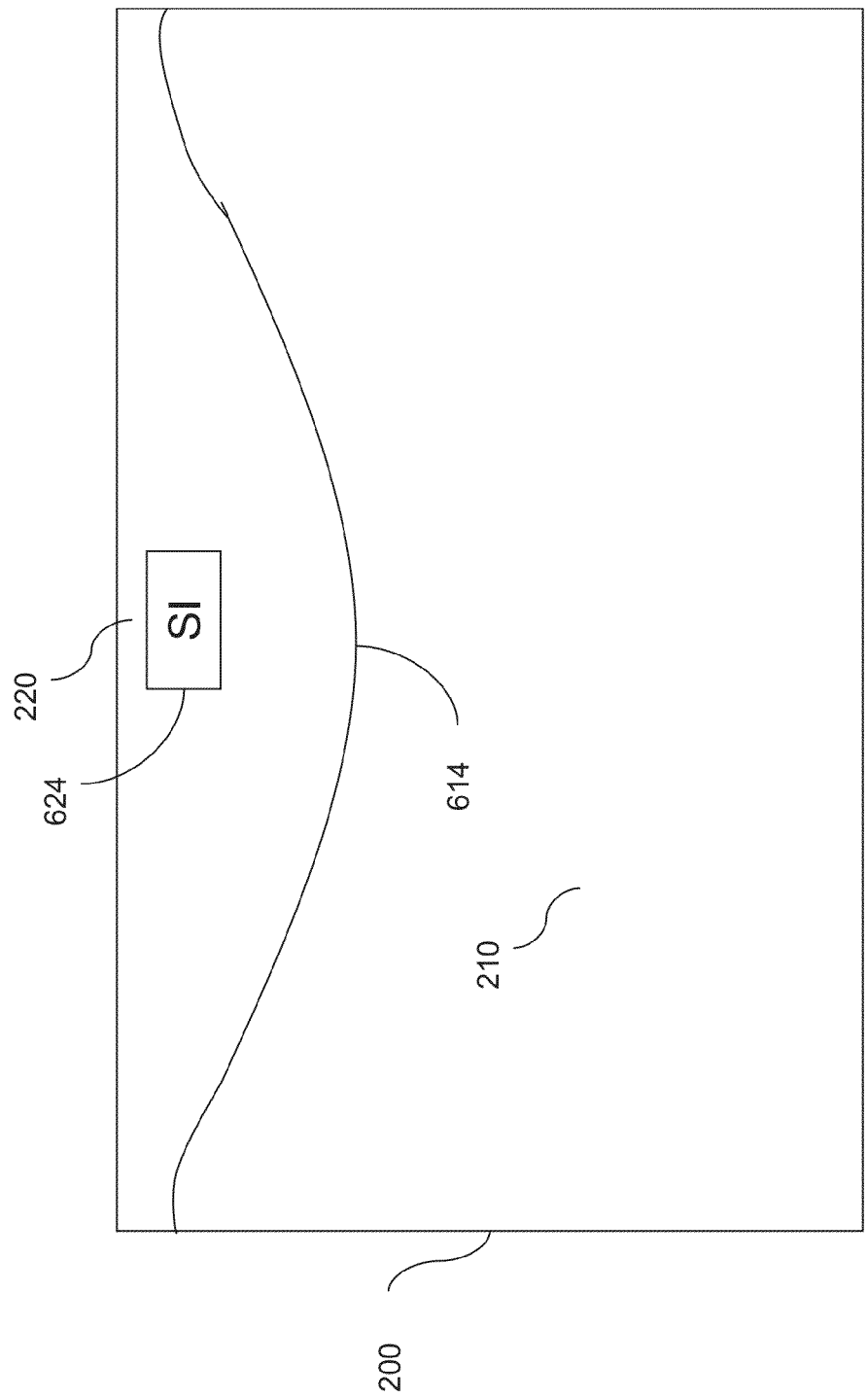

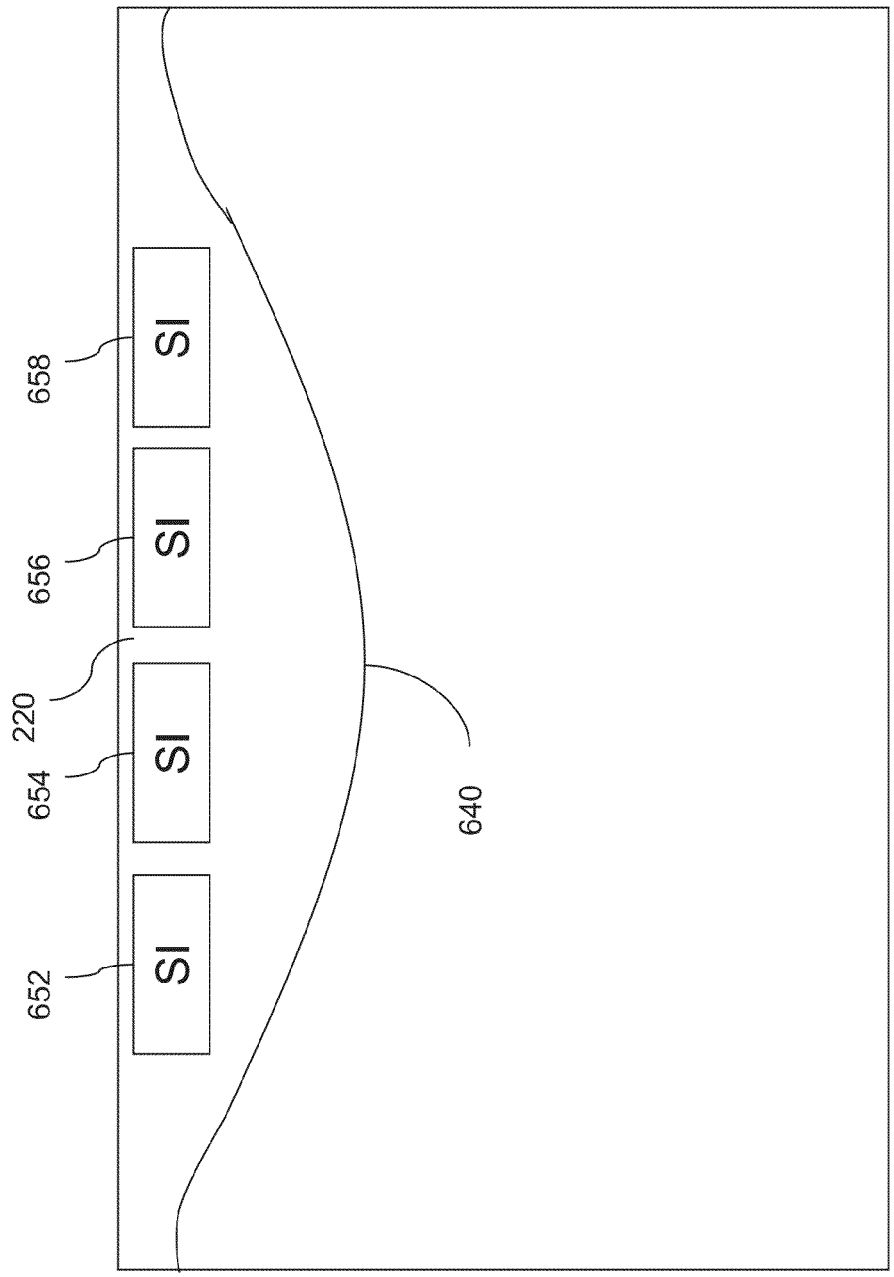

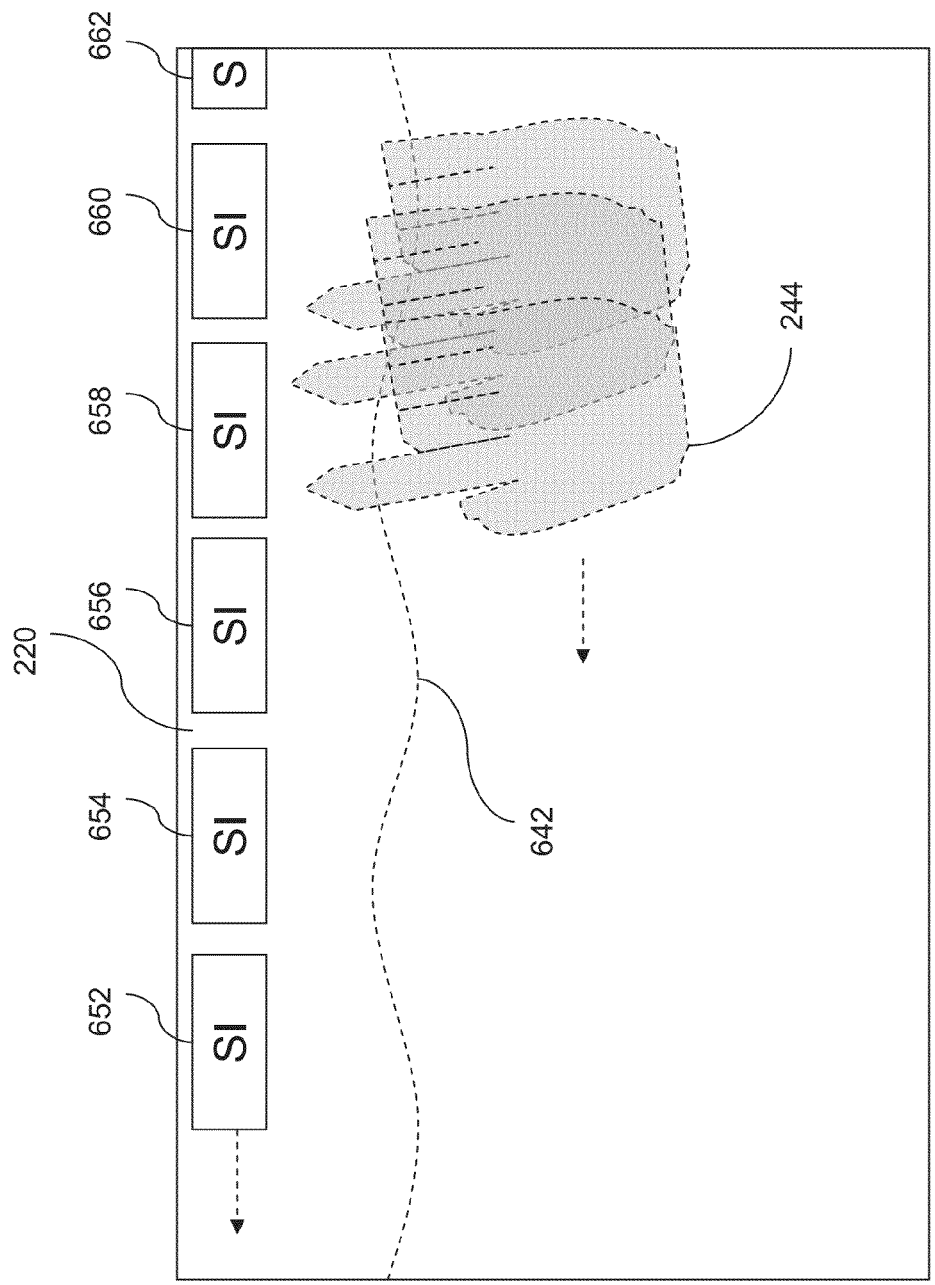

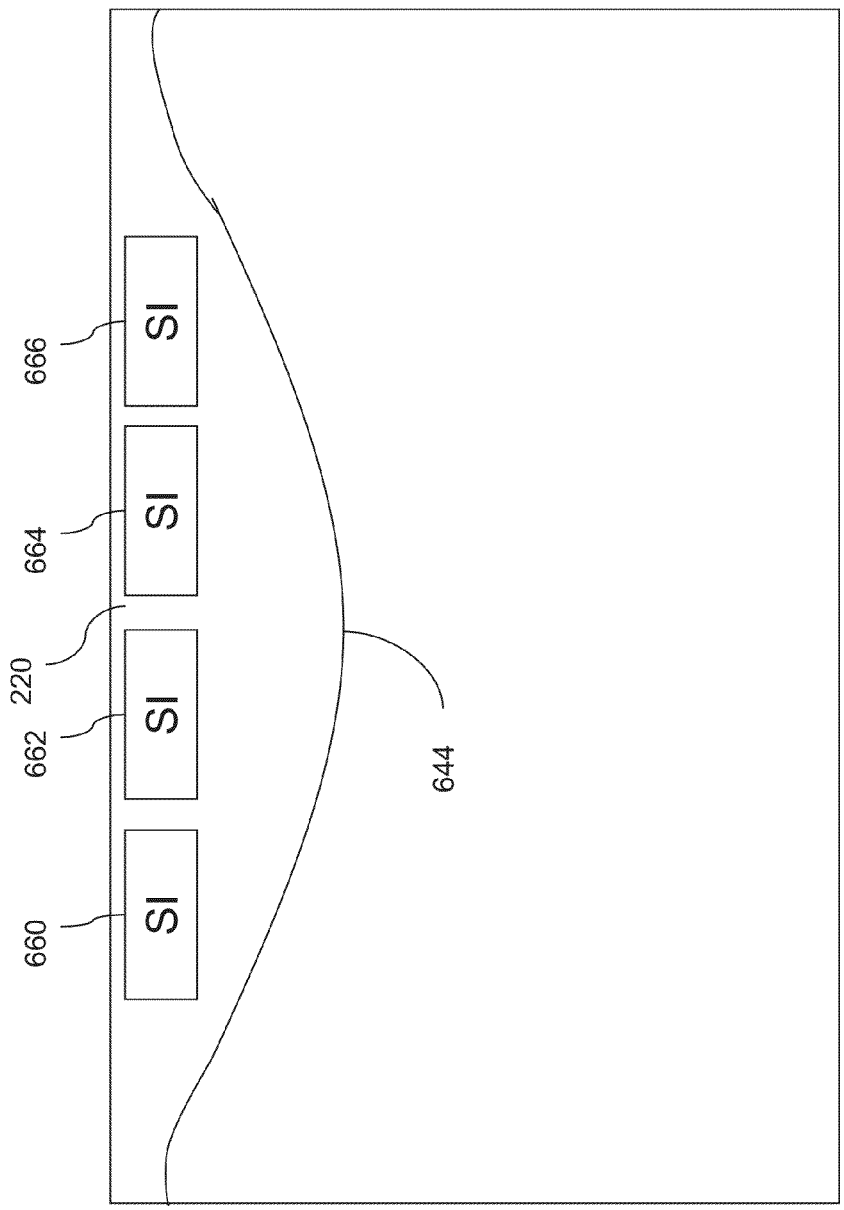

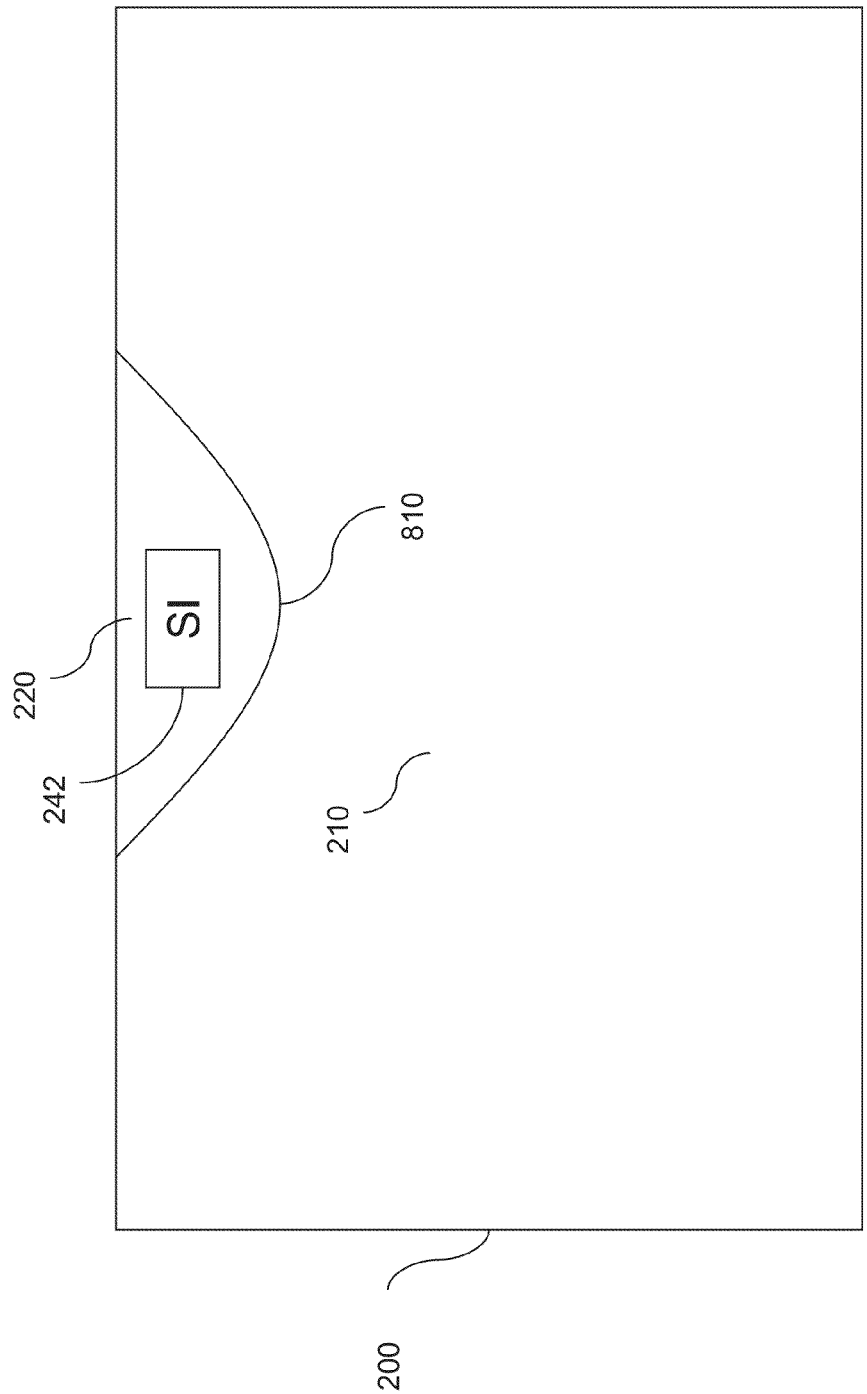

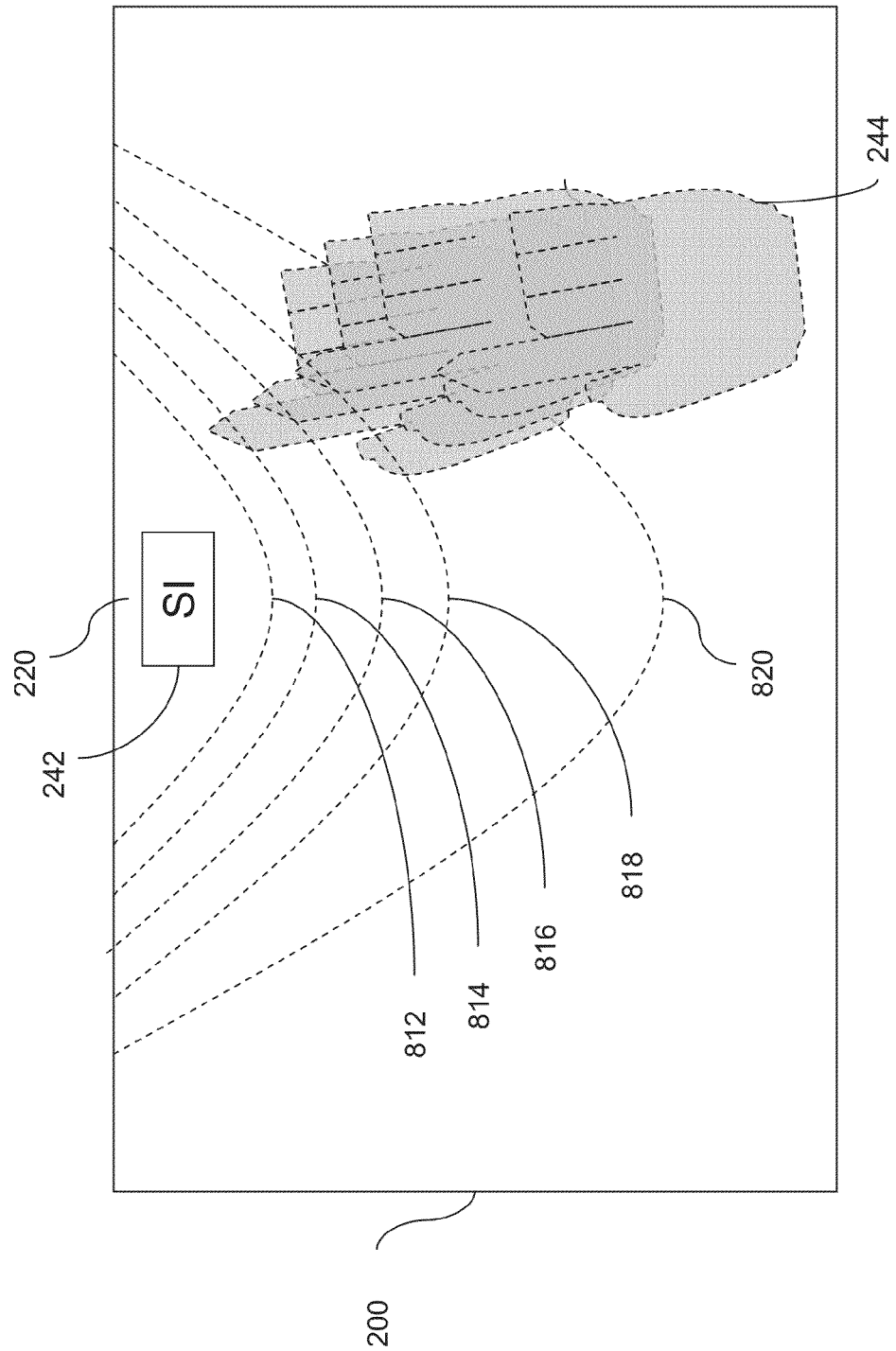

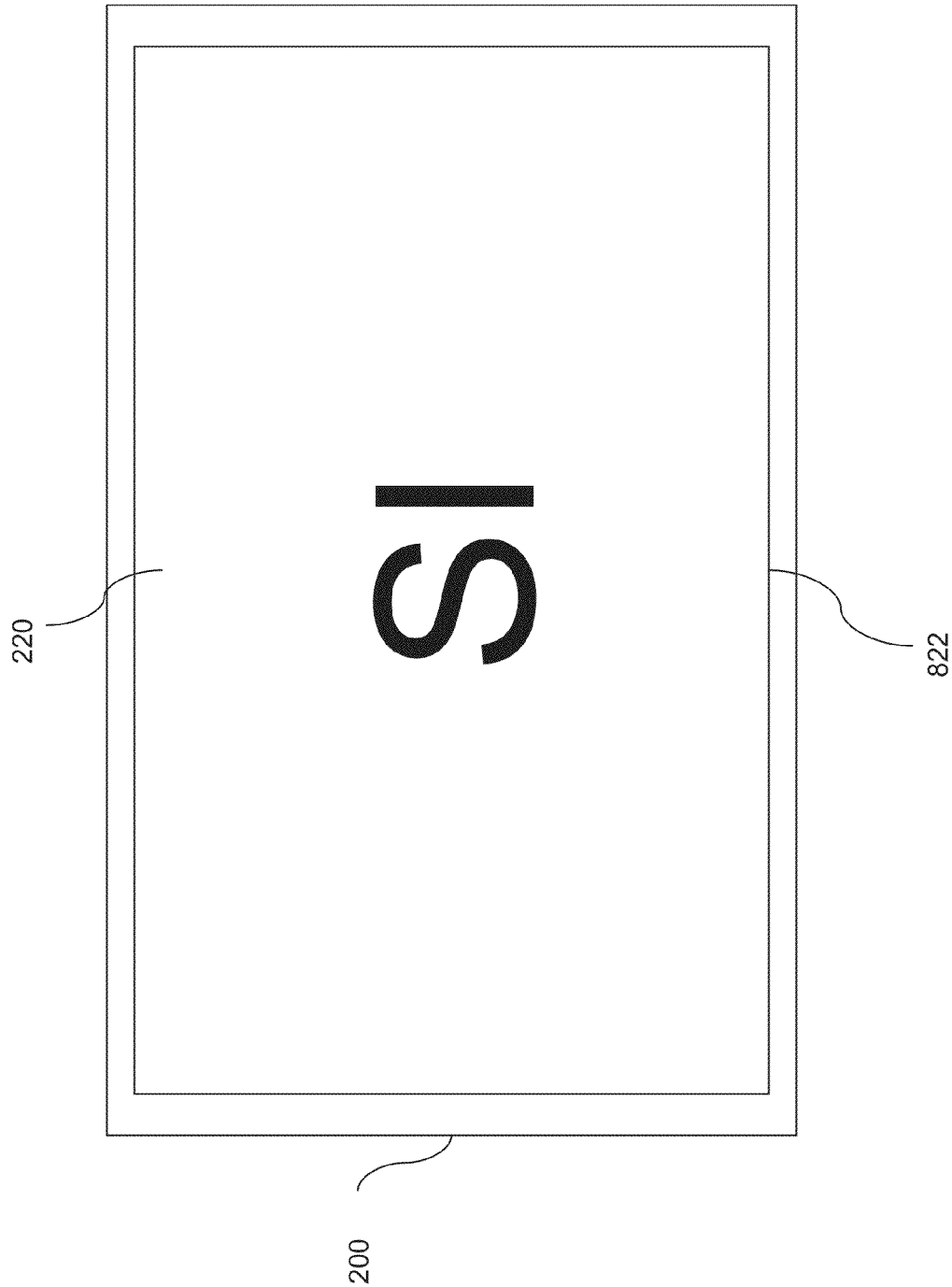

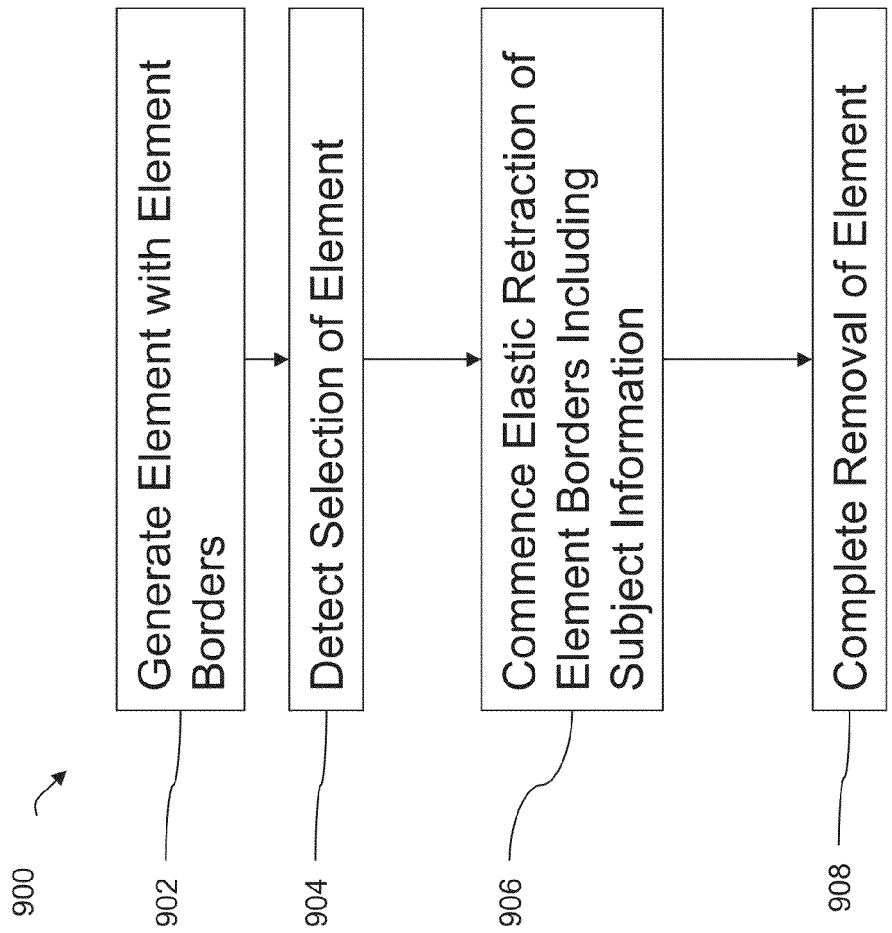

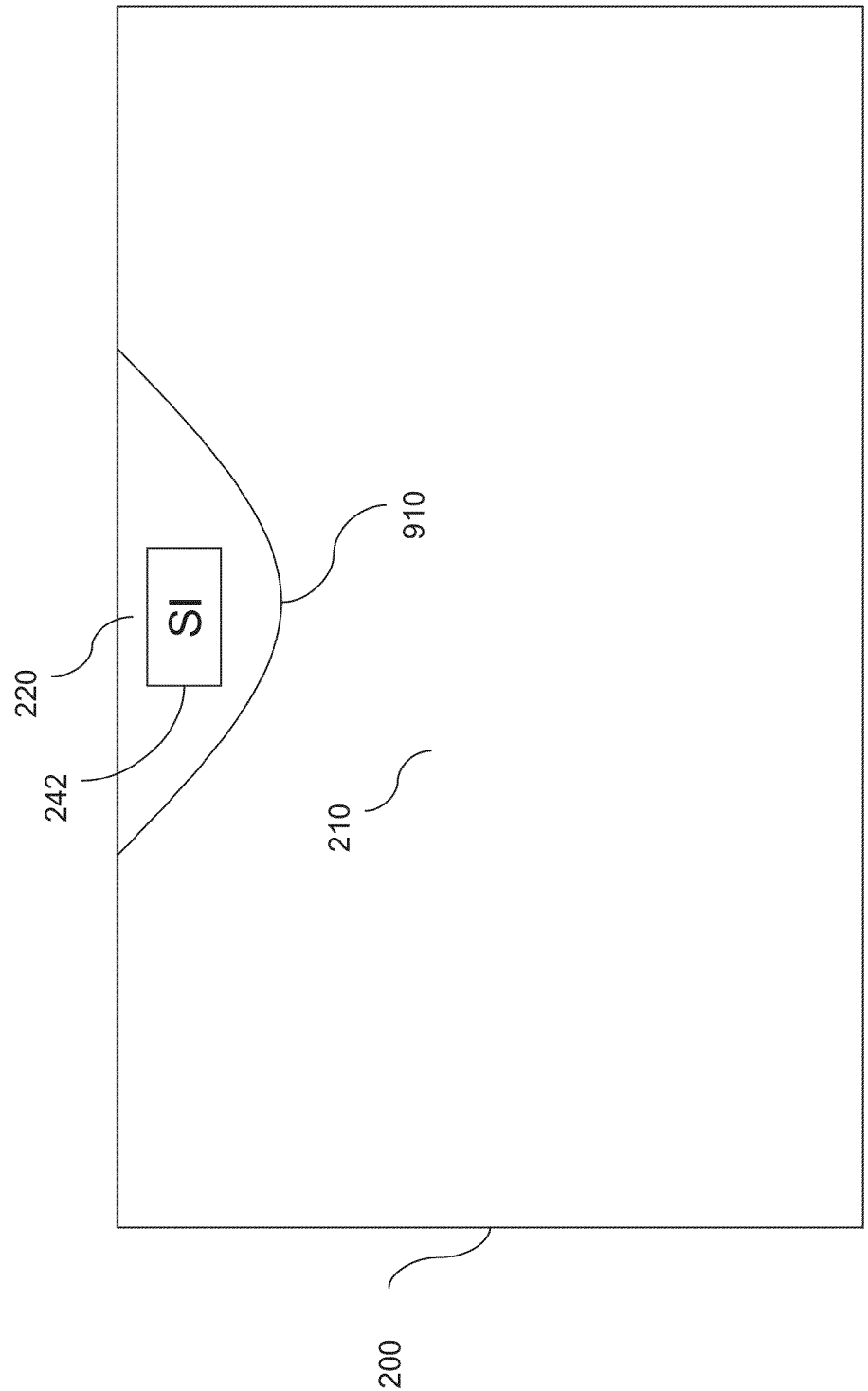

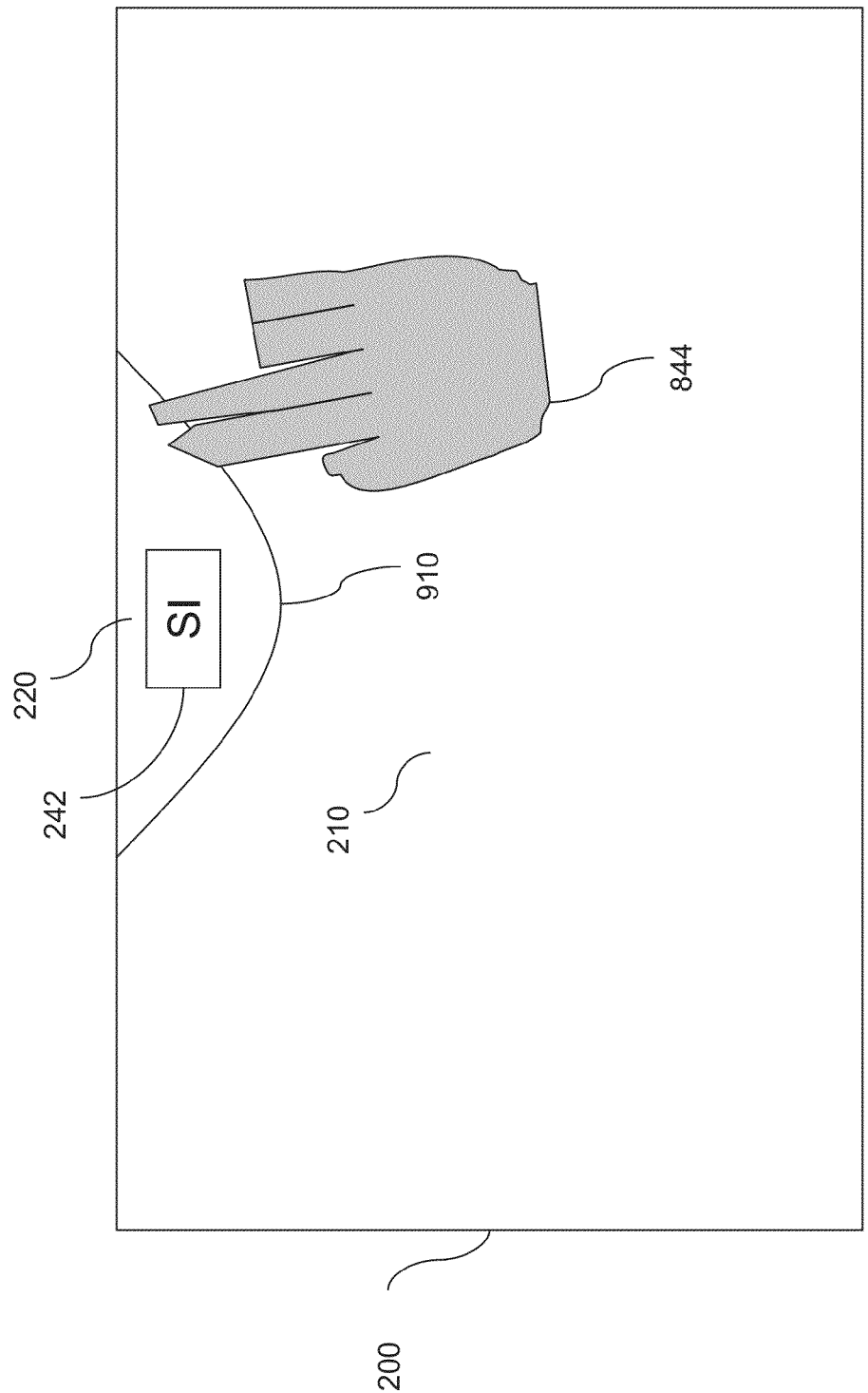

USER INTERFACE ELEMENT

FIELD

The present disclosure relates generally to electronic devices and display applications, and more particularly to methods and apparatus for displaying graphics and information in a user interface.

BACKGROUND

Electronic devices such as tablets, laptop computers, desktop computers, cellular telephones, personal digital assistants (PDAs), portable interne devices, portable music players, portable navigation devices, and handheld gaming devices typically include a visual display for rendering images.

Touch screen displays are becoming increasing popular for such electronic devices. Touch screen displays are electronic displays with the ability to detect a selection of the display, or an area thereof, based on physical contact, such as contact on the display by a user's finger(s) or a stylus or other device. Several touch screen technologies are known in the art, including resistive, capacitive, infrared, and surface acoustic wave (SAW) touch screen displays.

A touch screen display typically includes an electronic display and a substantially transparent touch screen that is laid over the electronic display. The electronic display is configured to present graphical and/or textual information. In general, the touch screen is configured to recognize physical contact and its position on the display screen, and the electronic device interprets the contact and thereafter performs an action based on the contact. This allows the display to be used as an input device, providing for interaction with a displayed graphical user interface (GUI), and for minimizing or omitting other input devices from the electronic device, such as a keyboard and/or mouse. An electronic device may include one or more integrated touch screen displays, or have one or more attached touch screen displays.

A touch screen display may render onto the display a user interface, such as a GUI, that allows a user to interact with the functions of the electronic device. For example, an operating system of the electronic device or a program executed by the electronic device may cause one or more graphical or textual images to be rendered on the electronic display, at least some of which can be selected by the user or are otherwise capable of some level of interaction. While conventional user interfaces, such as graphical user interfaces for touch screen displays, permit the selection of displayed elements through a user selection, they typically do not permit the manipulation of the displayed element, such as the manipulation of its size, shape, and orientation on the screen. To the extent that such manipulation is provided, it is limited to preset and lateral expansion and retraction that lacks an intuitive nature that is engaging and aesthetically pleasing to a user.

In addition, elements displayed on a user interface may include items of subject information, such as subject information received from programs running on the electronic device or from communication channels such as the internet or digital connection. While conventional user interfaces, such as graphical user interfaces for touch screen displays, may be configured to display one or more items of subject information in an element, the state of the subject information (i.e., the particular item of subject information and the number of displayed items of subject information) displayed in the element is generally not configured for manipulation by the user.

Accordingly, there is a need and desire for an electronic device including an intuitive and user-friendly user interface that provides these and other features, and a method of providing a user interface that includes these features.

BRIEF DESCRIPTION OF THE DRAWINGS

FIGS. 3A-3E illustrate an element generated in a user interface, in accordance with embodiments described herein.

FIG. 4 is a flow chart showing a process for expanding an element in a user interface, in accordance with embodiments described herein.

FIGS. 5A-5H illustrate an expansion of an element in a user interface, in accordance with embodiments described herein.

FIGS. 7A-7E illustrate an expansion of an element in a user interface, in accordance with embodiments described herein.

FIGS. 9A-9F illustrate transitioning of subject information in a user interface, in accordance with embodiments described herein.

FIGS. 11A-11D illustrate an expansion of an element in a user interface, in accordance with embodiments described herein.

FIG. 12 is a flow chart showing a process for removing an element in a user interface, in accordance with embodiments described herein.

FIGS. 13A-13D illustrate a removal of an element in a user interface, in accordance with embodiments described herein.

DETAILED DESCRIPTION

Figure 1:
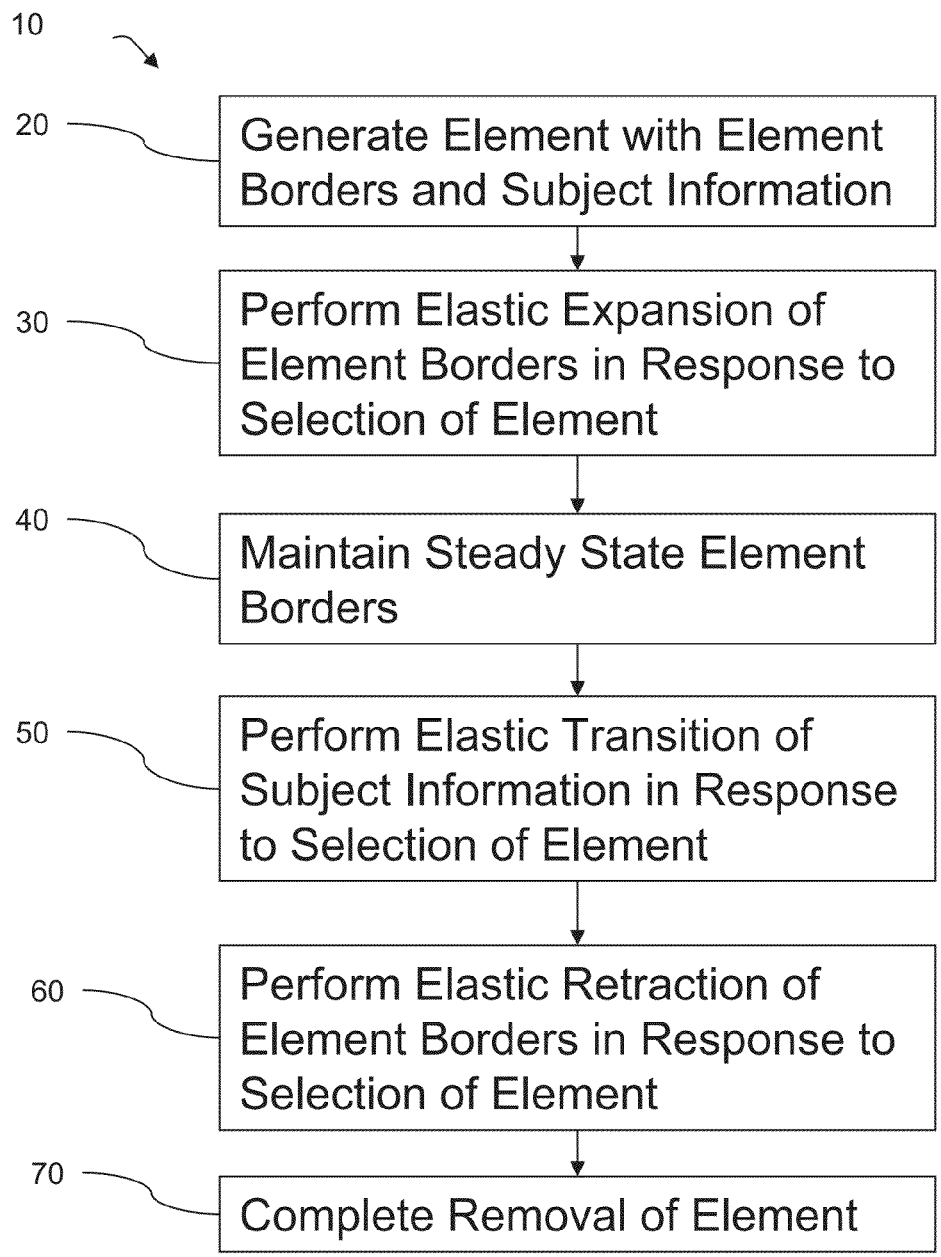
FIG. 1 is a flow chart showing a process for providing an element in a user interface, in accordance with embodiments described herein.

In the following detailed description, reference is made to various embodiments. These embodiments are described with sufficient detail to enable those skilled in the art to practice them. It is to be understood that other embodiments may be employed, and that various structural, logical and electrical changes may be made. In addition, reference is made to various processes including multiple steps. It should be understood that these steps need not be performed in the order that they are listed, unless specifically stated as such.

In accordance with the practices of persons skilled in the art of computer programming, one or more embodiments are described below with reference to operations that are performed by a computer system or other electronic systems. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

Aspects of the embodiments described herein may be implemented in hardware, software, or a combination thereof. When implemented in software, the aspects of the embodiments are essentially code segments to perform the necessary tasks. The code segments can be stored in a processor readable medium, which may include any medium that can store or transfer information. Examples of the processor readable mediums include an electronic circuit, a semiconductor memory device, a read-only memory (ROM), a flash memory or other non-volatile memory, a floppy diskette, a CD-ROM, an optical disk, a hard disk, etc.

Disclosed embodiments include methods and apparatus for providing one or more elements in a user interface. In one embodiment, an element is provided on a portion of a user interface, where the element is configured to allow an elastic manipulation of its borders, such as an elastic expansion including a fluctuating expansion and contraction of one or more of the element's borders, prior to the element's borders reaching a steady state. The elastic manipulation may occur during a generation of the element, or in response to a selection of the element. Described embodiments include an elastic expansion of the element that includes alteration of its shape and/or size in response to a selection of the element, and corresponding alterations of shapes and/or sizes items of subject information that is displayed in the element. Described embodiments also include an element displaying one or more items of subject information, where the items can be transitioned while the element's borders are subjected to an elastic motion. Other embodiments include one or more items of subject information (e.g., graphics and/or text elements within an element), where the size and/or shape of the subject information may be manipulated (e.g., subject to an elastic expansion and/or contraction) along with the element. Other embodiments include a process for removing an element from the display.

Other aspects, features, and techniques will be apparent to one skilled in the relevant art in view of the following detailed description of the embodiments.

FIG. 1 is a flow chart showing a process 10 for providing a user interface element on an electronic display. Process 10 is a high-level description of multiple different aspects of a process for providing a user interface element on a display, the features of which are discussed in further detail in connection with FIGS. 2-13. Process 10 begins with block 20, where a user interface element 220 (FIG. 3B) is generated. User interface element 220 may be generated with element borders designating the perimeter of the element having any desired shape, size, and location on the electronic display. User interface element 220 may be populated with one or more items of subject information 242 (FIG. 3E), such as text or graphics relating information that is received from programs running on the electronic device, such as an operating system or an application, or from communication channels that are received by the electronic device, such as messages or information received from an internet or digital connection.

In block 30, an elastic expansion of the borders of element 220 occurs in response to a selection of element 220. The selection may be a user selection, such as physical contact on a position on a touch screen electronic display that corresponds to the location of element 220 on the user interface, or the positioning of a cursor or other selection device over the position in which element 220 is displayed on the user interface. In one non-limiting example where element 220 is displayed on a touch screen device, elastic expansion may be performed in response to detecting a physical contact and downward pulling (i.e., dragging) motion on some portion of element 220.

The elastic expansion of a border of element 220 includes altering the shape, size, and/or position of the element 220 while providing an appearance that resembles a physically elastic material in the real world (i.e., a material that tends to resume some version of its original shape after contraction, dilation, stretching, or distortion). The elastic expansion of the borders of element 220 may include expanding at least one border of element 220 to a first position, and retracting the at least one border to a second position. The elastic expansion may include alternating between expansion and retraction until a desired steady state is reached, providing a "bouncing" appearance for the elastic expansion of element 220 that is both engaging and easily understandable to a user.

In block 40, the elastic expansion of element 220 is completed, and the borders of element 220 are maintained at a steady state. As shown in block 50, an elastic transition of subject information within element 220 may be performed, for example, in response to detecting another user selection of element 220, such as (in a case where element 220 is displayed on a touch screen device) a physical contact and horizontal swiping motion on some portion of element 220.

In block 50, an elastic retraction of the borders of element 220 is performed. The elastic retraction may include reducing the shape and/or size of the element 220 to a point where it is completely removed (i.e., wiped) from the screen. The elastic retraction may be performed in response to another user selection of element 220, such as (in a case where element 220 is displayed on a touch screen device) a physical contact and vertical pushing motion on some portion of element 220.

Figure 2:
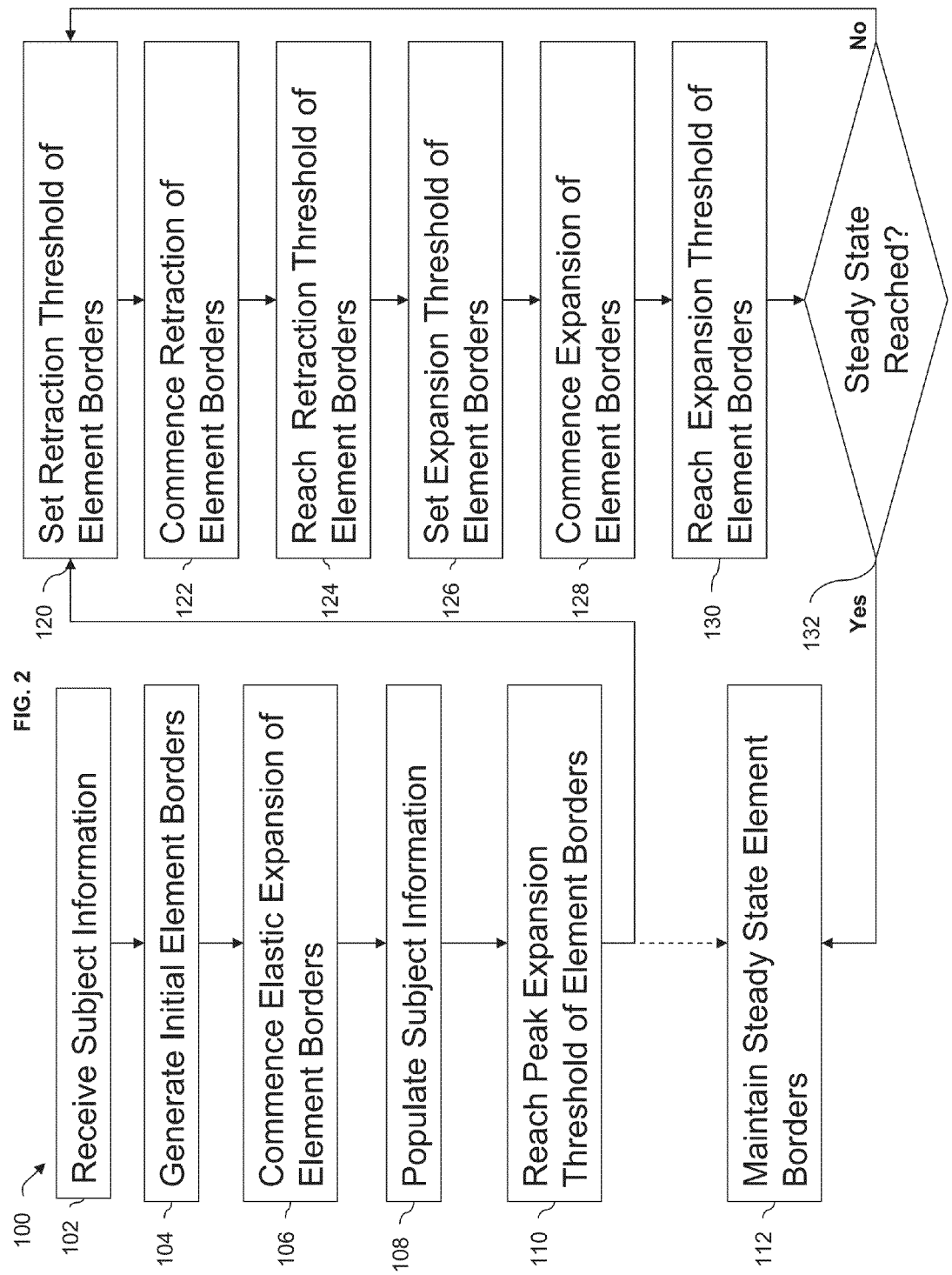
FIG. 2 is a flow chart showing a process for generating an element in a user interface, in accordance with embodiments described herein.

FIG. 2 is a flow chart showing a process 100 for generating an element in a user interface. FIGS. 3A-3E illustrate a display 200 of an electronic device upon which a user interface can be provided, where the user interface includes an element 220 (FIG. 3B) generated in accordance with process 100. Display 200 includes a graphics display area 210, which may be, for example, a visible portion of a screen on an electronic device.

In block 102 of process 100, subject information may be received from programs running on the electronic device, such as an operating system or an application, or from communication channels that are received by the electronic device, such as messages or information received from an interne or other digital connection. The subject information may be a type of information that is regularly updated, such as stock information, social media messages, news information, etc.

In FIG. 3A, display area 210 does not include element 220. Display area 210 may display other graphics and/or text, and may include a user interface that can be used to display and interact with an operating system of the electronic device (e.g., Android, Windows, DOS, Mac OS or OS/2, Unix, Linux, Palm OS, etc.), as well as various applications of the electronic device. Display area 210 may also display a background image when other active applications do not occupy the entire display area 210.

In block 104, element 220 (FIG. 3B) is initiated. As shown in FIG. 3B, element 220 may include relatively small initial borders. Element 220 may be generated in response to a particular type of received subject information, such as messages from an application or communication channel, in response to a user request, or for any other reason that may be specified by the operating system and/or an application running on the electronic device. Element 220 covers a portion of display 210, and may be located, for example, in a top center portion of display 210, as shown in FIG. 3B, or in any other desired portion of display 210.

Figure 3D:
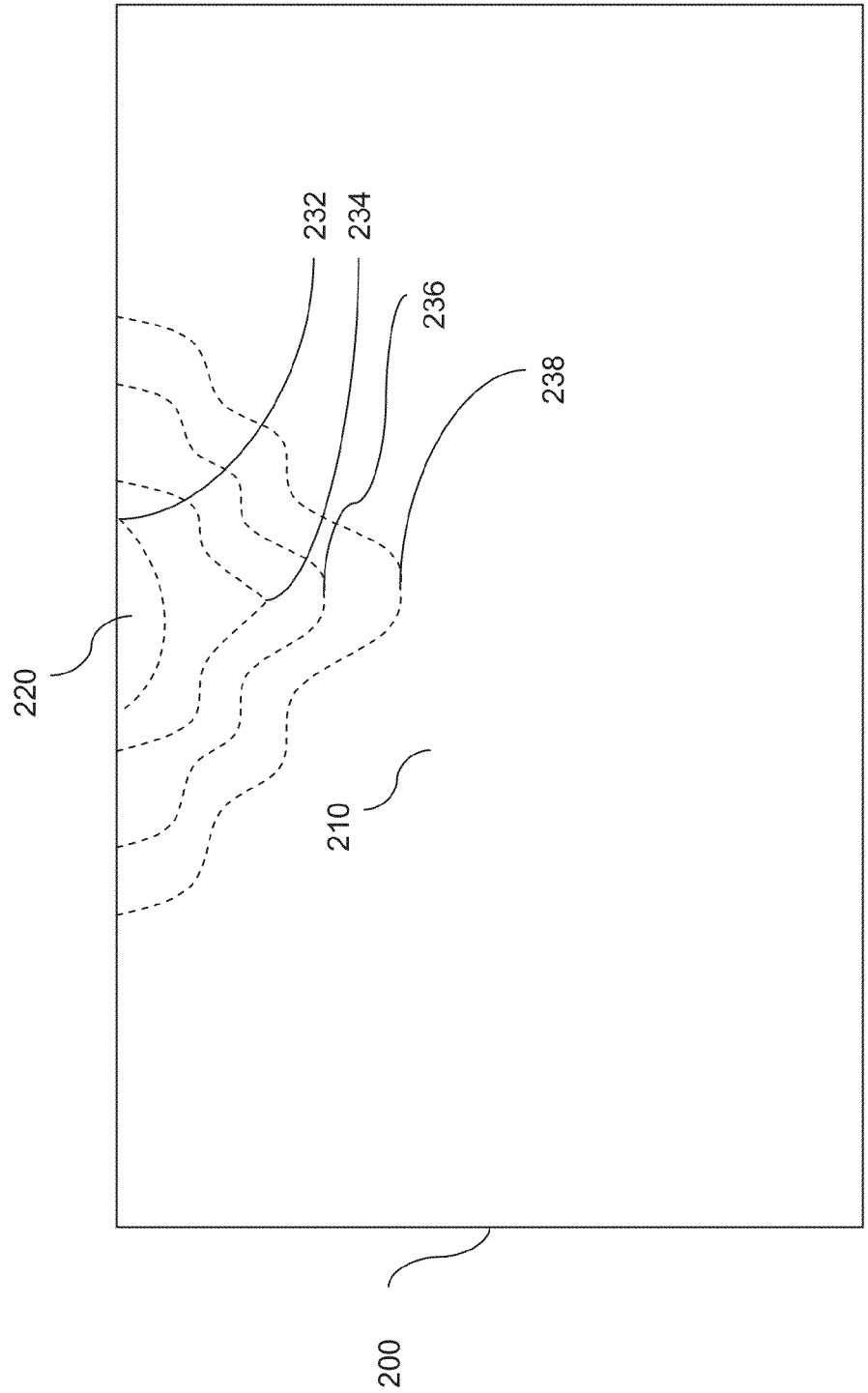

In block 106, an elastic expansion of the initial borders of element 220 is commenced. As shown in FIG. 3C, borders of element 220 are expanded across multiple intermediate thresholds 222, 224, 226, to a peak threshold 228. The particular size and shape of intermediate thresholds 222, 224, 226 and peak threshold 228 may be determined according to settings in the operating system of the electronic device, and/or by the relevant application to which the subject information to be displayed relates. For example, as shown in FIG. 3D, intermediate thresholds 232, 234, 236 and peak threshold 238 may have an amorphous shape that varies as the borders of element 220 expand.

In block 108, element 220 is populated with one or more items of subject information 242 (FIG. 3E). Item 242 may be displayed in graphic or textual form, and take up a portion or all of the internal surface area of element 220. Item 242 may also be a preview or indicator of the received subject information, such as an indicator that a message has been received. Alternatively, element 220 may be populated with subject information 242 after the elastic expansion reaches a peak threshold (e.g., 228, 238) (block 110), during an elastic retraction or expansion between intermediate thresholds (e.g., 222-226 or 232-236) (blocks 120-132), or after the elastic expansion of element 220 has settled and element 220 has reached a steady state threshold 240 (FIG. 3E) (block 112).

In block 110, a peak threshold (e.g., 228, 238) of the elastic expansion is reached. Upon reaching the peak threshold, process 100 enters a loop that includes blocks 120-130. Alternatively, as indicated by the dotted connection between blocks 110 and 112, the borders of element 220 may be maintained in a steady state without performing blocks 120-130.

In block 120, a first retraction threshold for the borders of element 220 is set. For example, the first retraction threshold may be one of the intermediate thresholds (e.g., intermediate threshold 222) shown in FIG. 3D. The first retraction threshold may also be a different threshold, such as one set by the operating system or relevant application, or determined according to other factors such as the subject information 242 used to populate element 220.

In blocks 122 and 124, the borders of element 220 are retracted to the first retraction threshold. In block 126, an expansion threshold is set, which may be, for example, another of the intermediate thresholds (e.g., threshold 226) shown in FIG. 3D, or a different threshold. In blocks 128 and 130, the borders of element 220 are expanded to the set expansion threshold. The alternating expansion and contraction between the different thresholds creates a "bouncing" effect providing an appearance that resembles a physically elastic material.

In block 132, a determination is made whether further expansions and/or contractions are appropriate. The determination is based upon a preset configuration in the operating system or relevant application, or on other factors, such as the nature of the subject information to be displayed. If no further expansions and/or contractions are appropriate and a steady state border of element 220 is reached, element 220 maintains a steady state border 240. If, on the other hand, it is determined that further expansions and/or contractions are appropriate, element 220 is subjected to further expansions and/or contractions by repeating loop 120-130.

FIG. 4 is a flow chart showing a process 300 for performing an elastic expansion of an element 220. FIGS. 5A-5H illustrate examples of an elastic expansion in accordance with process 300.

In blocks 302 and 304 of process 300, subject information is received, and element 220 is generated on a portion of display 200 having a steady state border 250 and populated with subject information 242, as shown in FIG. 5A. The subject information 242 populating element 220 may be, for example, a preview or indicator of received subject matter, such as an indicator that a message has been received. The acts in blocks 302 and 304 of process 300 may be performed in accordance with process 100 described above, or through other suitable methods of rendering element 220 on display 210.

Figure 5B:
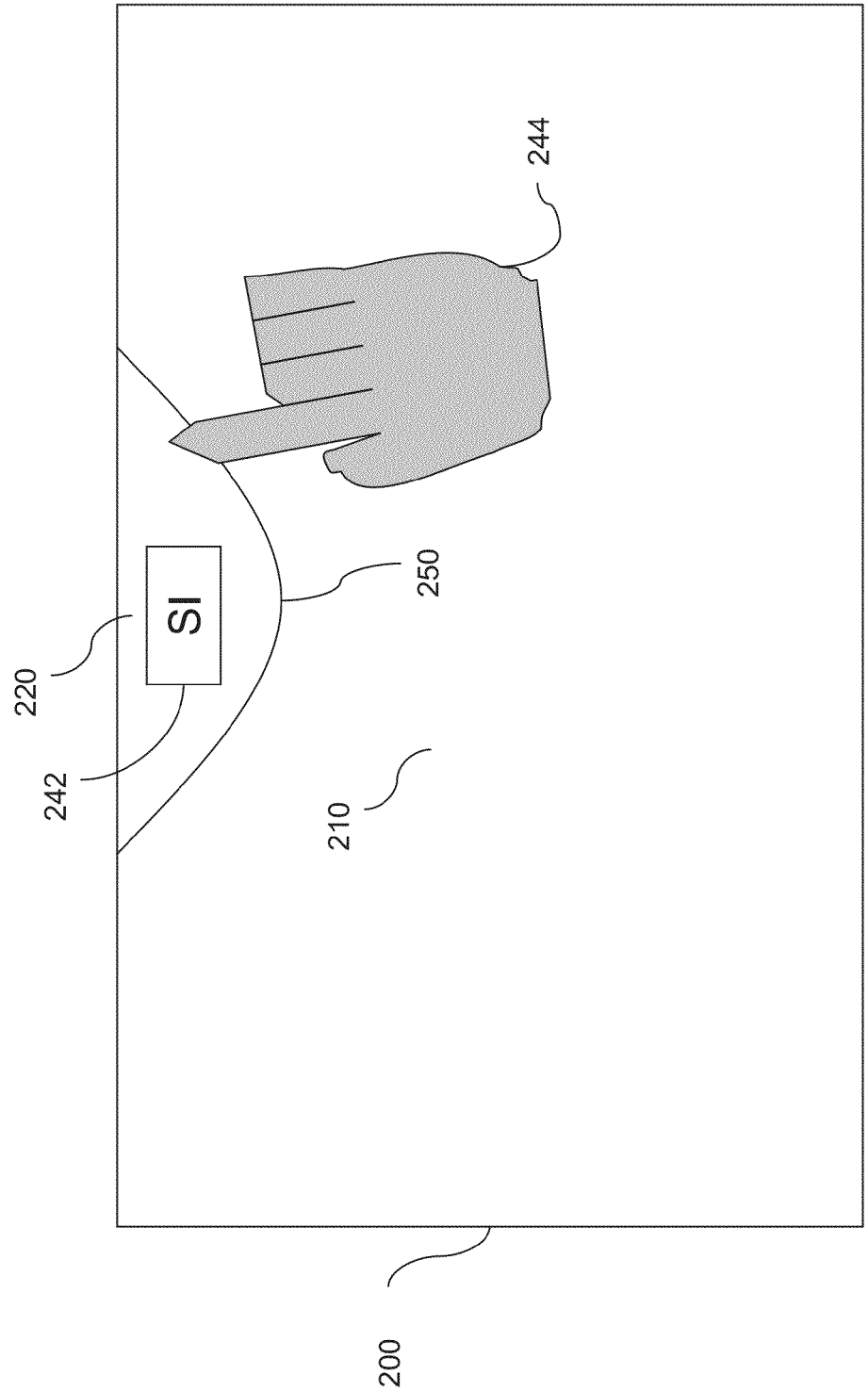

In block 306, a selection of element 220 is detected. The selection of element 220 may be a selection by a user of the electronic device, such as physical contact on a position of a touch screen electronic display that corresponds to the location of element 220 on the user interface, or the positioning of a cursor or other selection device over the position in which element 220 is displayed on the user interface. In one non-limiting example, as shown in FIGS. 5B and 5C, elastic expansion of element 220 may be performed in response to detecting a physical contact (e.g., a touch by a user's finger 244 or a stylus) and downward pulling (i.e., dragging) motion on a portion of a touch screen corresponding to some portion of element 220. In another non-limiting example, elastic expansion of element 220 may be performed in response to detecting a tapping (e.g., one or multiple touches by a user's finger 244 or a stylus) on a portion of the touch screen corresponding to some portion of element 220.

The touch screen may be configured to detect the pulling motion across display 210, and provide information to a processor to determine appropriate thresholds for elastic expansion in response to the detected user selection. For example, vector graphics may be determined based upon characteristics of the selection (e.g., based upon the position, direction, and magnitude of a physical contact and downward pulling motion, or a position and magnitude of a tapping motion).

In block 308, the borders of element 220 are expanded across multiple intermediate thresholds 252, 254, and 256, to a peak expansion threshold 260. The expansion across intermediate thresholds 252, 254, 256 to peak expansion threshold 260 may occur in a smooth continuous expansion of the borders, and may be proportionate to the direction and magnitude of a downward pulling motion that serves as the selection of element 220.

In block 310, a release of element 220 is detected. In one non-limiting example, the release may be indicated by a removal of a physical contact used for selection of element 220, or a one or more other inputs from one or more input/output devices. In another embodiment, for example when the selection of element 220 is based upon detection of a tapping of element 220, element 220 may be considered to be released upon reaching a peak expansion threshold 260.

Upon detecting a release of element 220 in block 310 and/or reaching peak expansion threshold 260, process 300 enters a loop that includes blocks 320-330. In block 320, a first retraction threshold for the borders of element 220 is set. For example, the first retraction threshold may be one of the intermediate thresholds (e.g., intermediate threshold 252) shown in FIG. 5C. The first retraction threshold may also be set by the operating system or relevant application, or determined according to other factors, for example, such as the subject information 242 used to populate element 220.

In blocks 322 and 324, the borders of element 220 are retracted to the first retraction threshold. In block 326, an expansion threshold is set, which may be, for example, another of the intermediate thresholds (e.g., threshold 258) shown in FIG. 5C, or a different threshold. In blocks 328 and 330, the borders of element 220 are expanded to the set expansion threshold. The alternating expansion and contraction between the different thresholds creates a "bouncing" effect providing an appearance that resembles a physically elastic material.

In block 332, a determination is made whether further expansions and/or contractions are appropriate. The determination is based upon a preset configuration in the operating system or relevant application, or on other factors, such as the nature of the subject information to be displayed. If no further expansions and/or contractions are appropriate, element 220 maintains a steady state border 262 (FIG. 5D) and the elastic expansion process 300 is completed in block 312. Steady state border 262 may be broader than the initial borders of element 220, but smaller than the peak expansion threshold 260.

If, on the other hand, it is determined that further expansions and/or contractions are appropriate, element 220 is subjected to further expansions and/or contractions by repeating loop 320-330, using one or more other expansion and/or contraction thresholds (such as intermediate thresholds 254, 256).

The peak expansion threshold 260 and first retraction threshold (e.g., threshold 252) may represent the maximum and minimum thresholds for the border of element 220, and subsequent thresholds set in loop 320-330 (e.g., a second retraction threshold and/or a second expansion threshold) are intermediate between the maximum and minimum thresholds. This provides an elastic settling appearance of the borders of element 220 as the borders approach a steady state.

Figure 5D:
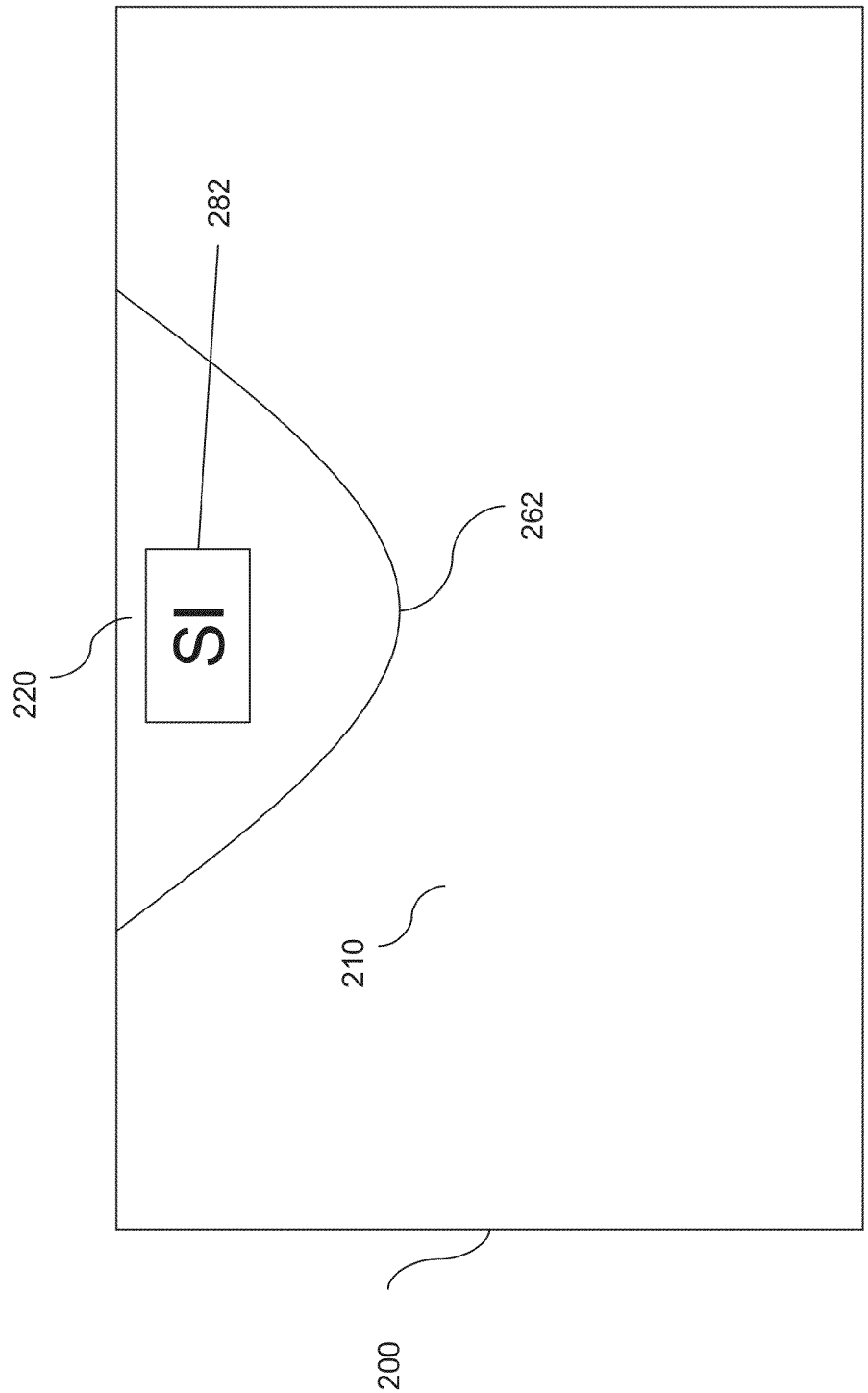

In an example where only a preview or indication of the item of subject information 242 is displayed in element 220 prior to the elastic expansion, a more complete version (e.g., a complete message) of the item of subject information 242 may be displayed when element 220 is in the expanded state shown in FIG. 5D. In another embodiment shown in FIG. 5E, element 220 may be configured to settle at a steady state border 290 sufficient to display multiple items of subject information 292, 294, 296. The number of items of subject information used to populate element 220 may be determined according to, for example, a number of items of subject information that have been recently updated, as well as the dimensions of the peak expansion threshold 260 and/or steady state border 290 of element 220.

In another embodiment shown in FIGS. 5F-5H, element 220 may substantially change its shape during the elastic expansion of process 300. For example, as shown in FIG. 5F, as element 220 is expanded to a peak threshold 310, the borders of element 220 may morph as indicated by the intermediate thresholds 302, 304, 306, 308, and retraction/expansion thresholds 312, 314, 316. In one non-limiting example shown in FIGS. 5F and 5G, element 220 morphs from a semi-oval located in a top center portion of display 210 into an amorphous shape occupying an entire top portion of display 210. As shown in FIG. 5H, before or after settling into a steady state border 318, element 220 may be populated with one or more additional items of subject information 332, 334, 336. In addition, or alternatively, a more complete version (e.g., a complete message) of the item 242 may be displayed when element 220 is in the expanded state shown in FIG. 5H.

Figure 6:
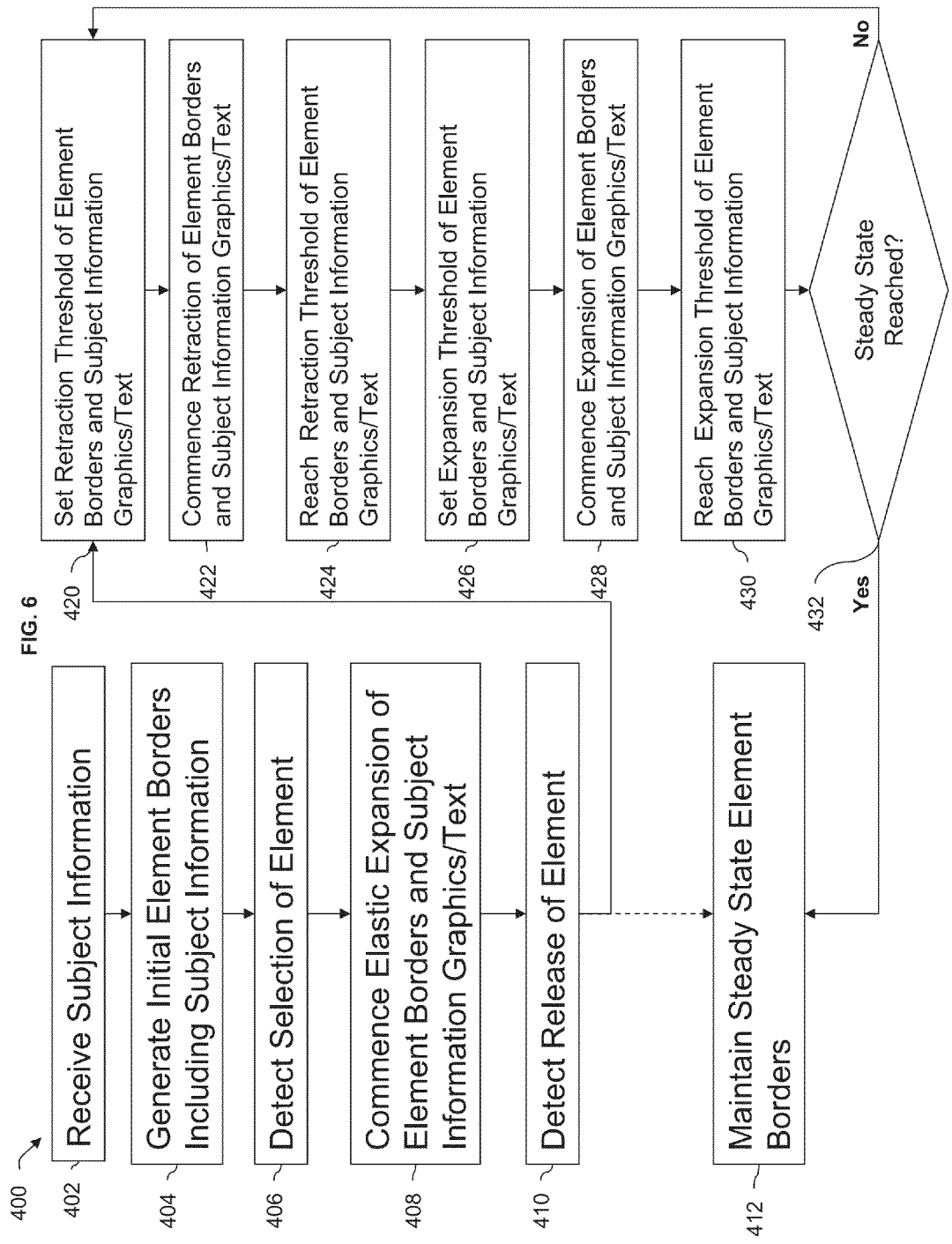
FIG. 6 is a flow chart showing a process for expanding an element in a user interface, in accordance with embodiments described herein.

FIG. 6 is a flow chart showing another embodiment of a process 400 for performing an elastic expansion of an element 220. FIGS. 7A-7E illustrate a display 200 of an electronic device, including an example of an element 220 subjected to an elastic expansion in accordance with process 400.

In blocks 402 and 404 of process 400, subject information is received, and element 220 is generated on a portion of display 200 having a steady state border 340 and populated with subject information 242, as shown in FIG. 7A. As with blocks 302 and 304 of process 300, the acts in blocks 402 and 404 of process 400 may be performed in accordance with process 100 described above, or through other suitable methods of rendering element 220 on display 210.

In block 406, a selection of element 220 is detected. As with block 306 of process 300, the selection of element 220 may be, for example, physical contact on a position on a touch screen electronic display that corresponds to the location of element 220 on the user interface, or the positioning of a cursor or other selection device over the position in which element 220 is displayed on the user interface. In the non-limiting example shown in FIGS. 7B and 7C, elastic expansion of element 220 may be performed in response to detecting a physical contact (e.g., a touch by a user's finger 244 or a stylus) and downward pulling (i.e., dragging) motion on a portion of a touch screen corresponding to some portion of element 220.

As with process 300, the touch screen may be configured to detect the pulling motion across display 210, and provide information to a processor to determine appropriate thresholds for elastic expansion of element 220 in response to the detected user selection. In addition, in process 400, appropriate thresholds for elastic expansion of the item of subject information 242 displayed in element 220 may also be determined. For example, vector graphics for both element 220 and item 242 may be determined based upon the selection (e.g., based upon the position, direction, and magnitude of the physical contact and downward pulling motion).

In block 408, the borders of element 220 are expanded across multiple intermediate thresholds 342, 344, 346, 348 to a peak expansion threshold 350. In addition, the borders of item 242 are expanded across intermediate thresholds 352, 354, 356, 358 to a peak expansion threshold 360. The expansion of element 220 across intermediate thresholds 342, 344, 346, 348 to peak expansion threshold 350, and the expansion of item 242 across intermediate thresholds 352, 354, 356, 358 to a peak expansion threshold 360, may occur in a smooth continuous expansion of the borders proportionate to the direction and magnitude of a downward pulling motion that serves as the selection of element 220.

In another embodiment, element 220 may substantially change its shape during the elastic expansion of process 400. For example, as shown in FIGS. 7C and 7D, as element 220 is expanded to a peak threshold 350, the borders of element 220 may morph as indicated by the intermediate thresholds 342, 344, 346, 348. In one non-limiting example shown in FIG. 5F, element 220 morphs from a semi-oval located in a top center portion of display 210 into an amorphous shape occupying an entire top portion of display 210.

In block 410, a release of element 220 is detected. In one non-limiting example, the release may be indicated by a removal of user's finger 244 or stylus used for selection of element 220, or a one or more other inputs from one or more input/output devices. In another embodiment, for example when the selection of element 220 is based upon detection of a tapping of element 220, element 220 may be considered to be released upon reaching a peak expansion threshold 260.

Upon detecting a release of element 220 in block 410 and/or reaching peak expansion threshold 350, process 400 enters a loop that includes blocks 420-430. In block 420, a first retraction threshold for the borders of element 220, and a first retraction threshold for the borders of item 242, is set. For example, the first retraction threshold of element 220 may be one of the intermediate thresholds 342-348 shown in FIG. 7C, or another threshold, such as retraction threshold 362 shown in FIG. 7D. In another example, the first retraction threshold of the item of subject information 242 may be one of the intermediate thresholds 352-358 shown in FIG. 7C, or another threshold, such as retraction threshold 372 shown in FIG. 7D. The respective first retraction thresholds for element 220 and item 242 may also be set by the operating system or relevant application, or determined according to other factors, for example, such as the subject information 242 used to populate element 220.

In blocks 422 and 424, the borders of element 220 are retracted to the first retraction threshold of element 220, and the borders of item 242 are retracted to the first retraction threshold of item 242. It should be understood that the respective retractions of element 220 and item 242 are not necessarily synchronized, and one may fluctuate between expanding and retracting faster or slower than the other.

In block 426, a second expansion threshold of element 220 is set, which may be, for example, another of the intermediate thresholds 342-348 shown in FIG. 7C, or a different threshold, such as threshold 366 shown in FIG. 7D. In addition, a second expansion threshold of item 242 is set, which may be, for example another of the intermediate thresholds 352-358 shown in FIG. 7C, or a different threshold, such as threshold 376 shown in FIG. 7D. In blocks 428 and 430, the borders of element 220 and item 242 are expanded to the respective expansion thresholds. The alternating expansion and contraction between the different thresholds creates a "bouncing" effect for both element 220 and the item of subject information 242 displayed therein.

In block 432, a determination is made whether further expansions and/or contractions of element 220, item 242, or both are appropriate. The determination is based upon a preset configuration in the operating system or relevant application, or on other factors, such as the nature of the subject information to be displayed. If no further expansions and/or contractions are appropriate and steady state borders of element 220 and item 242 are reached, element 220 maintains a steady state border 368 and item 242 maintains a steady state border 378, and the elastic expansion process 400 is completed in block 412. If, on the other hand, it is determined that further expansions and/or contractions are appropriate, element 220 is subjected to further expansions and/or contractions by repeating loop 420-430 for element 220, item 242, or both, using one or more other respective expansion and/or contraction thresholds (e.g., threshold 364 for element 220 and threshold 374 for item 242).

Figure 8:
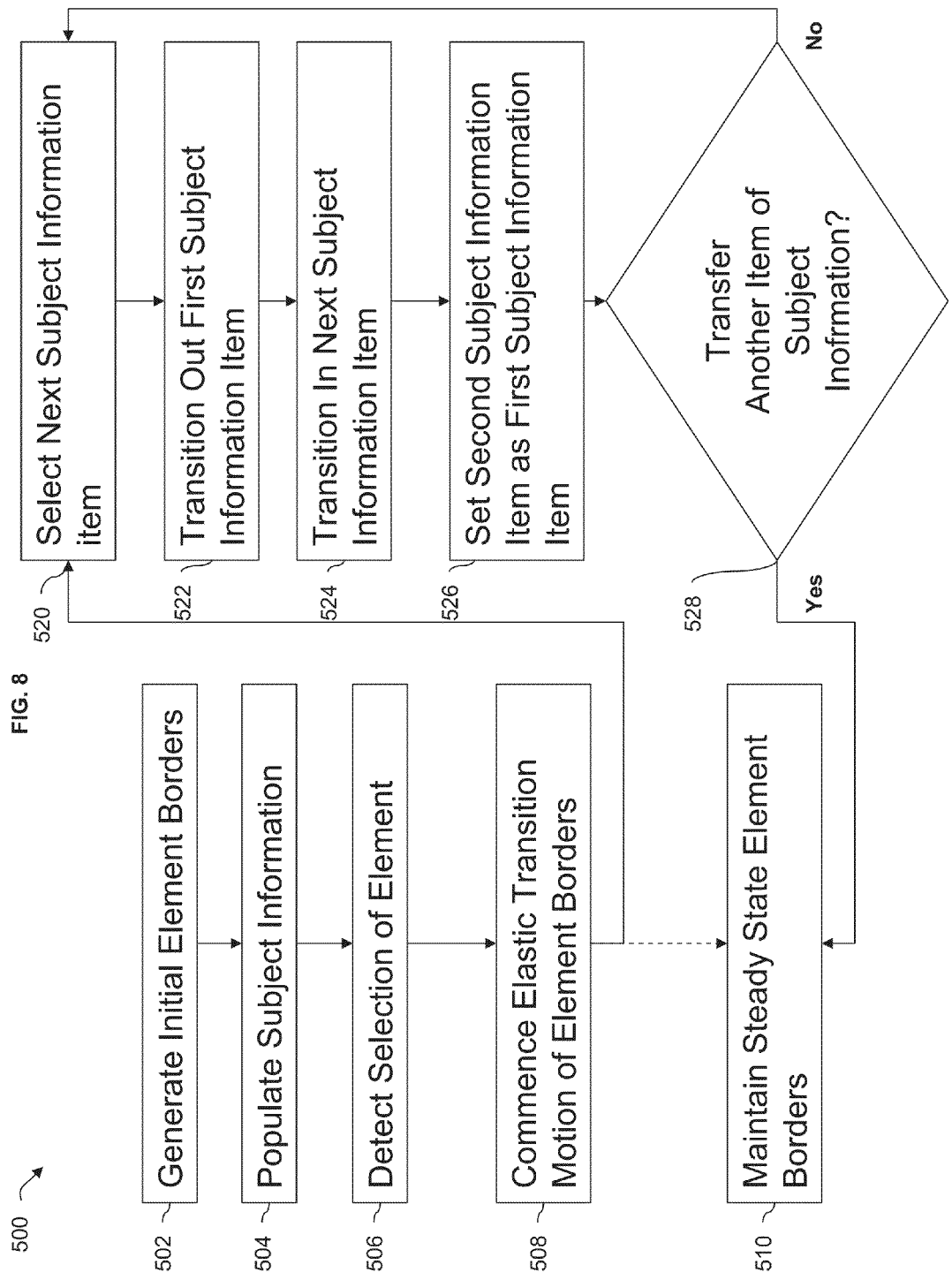
FIG. 8 is a flow chart showing a process for transitioning items of subject information in an element in a user interface, in accordance with embodiments described herein.

FIG. 8 is a flow chart showing a process 500 for transitioning items of subject information in an element in a user interface. FIGS. 9A-9F illustrate a display 200 including an element 220 configured to transition items of subject information in accordance with process 500.

In blocks 502 and 504, element 220 is generated with a steady-state border 610 and populated with at least one item of subject information 622, as shown in FIG. 9A. Element 220 may be generated in accordance with process 100 described above. In another embodiment, blocks 502 and/or 504 may also include subjecting element 220 to an elastic expansion in accordance with processes 300 or 400 described above, prior to reaching steady-state border 610. In the non-limiting example shown in FIG. 9A, steady-state border 610 may form an amorphous shape occupying an entire top portion of display 210.

In block 506, a selection of element 220 is detected. As in processes 300 and 400, the selection of element 220 may be, for example, physical contact on a position on a touch screen electronic display that corresponds to the location of element 220 on display area 210, or the positioning of a cursor or other selection device over the position of element 220 in display area 210. In the non-limiting example shown in FIG. 9B, elastic transition of item 622 in element 220 may be performed in response to detecting a physical contact (e.g., a touch by a user's finger 244 or a stylus) and horizontal swiping motion on a portion of a touch screen corresponding to some portion of element 220.

Figure 9B:
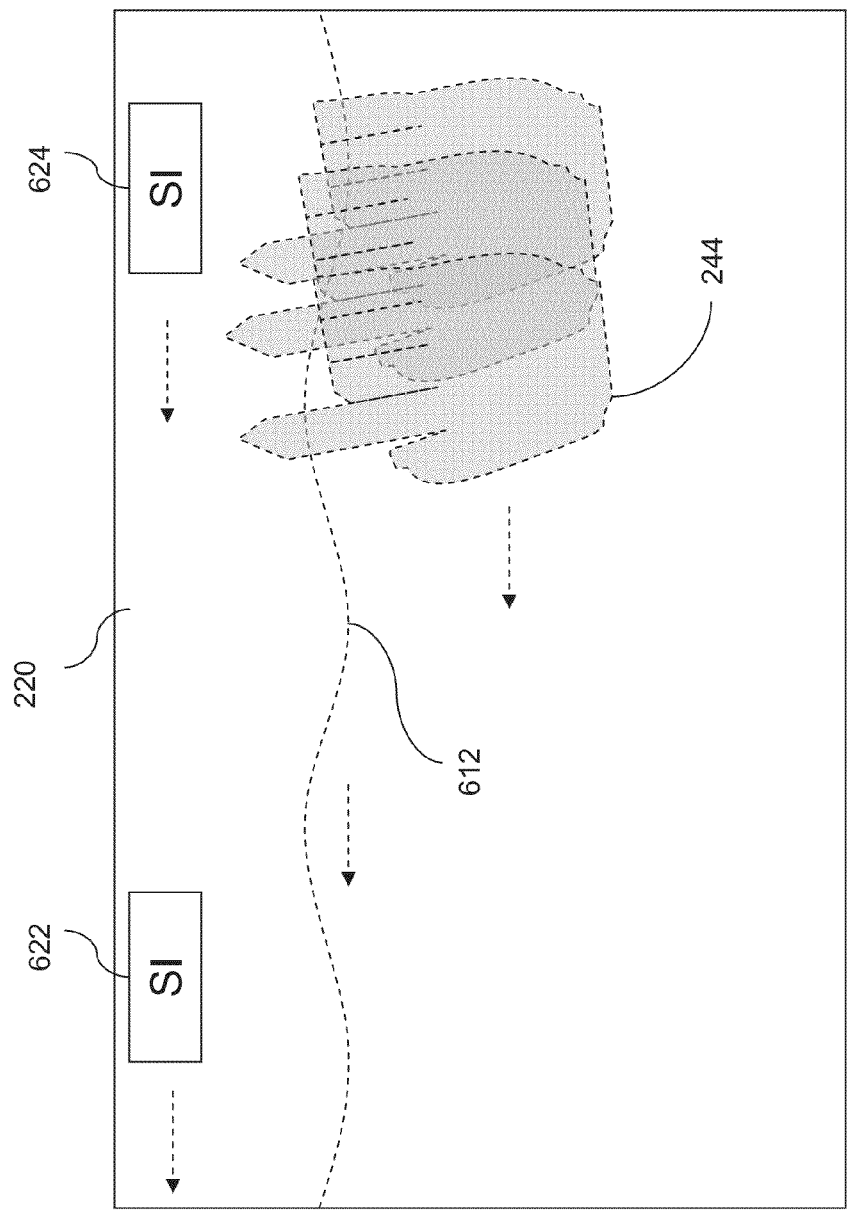

In block 508, an elastic transition motion of the borders of element 220 is commenced. The elastic transition motion may be, for example, a wavelike motion having peaks and troughs at various points in border 612 of element 220. As shown in FIG. 9B, the locations of the peaks and troughs transition in a horizontal direction corresponding to the selection of element 220. The elastic transition motion in block 508 continues as process 500 enters a loop of elements 520-526.

In block 520, a next item of subject information 624 for displaying in element 220 is selected. Item 624 may be in graphic or textual form, and may be, for example, an update of the subject information of item 622, or another related or unrelated type of subject information 622. For example, item 624 may represent subject information from another active application or communication channel.

In block 522, the first item of subject information 622 is transitioned out of element 220. For example, as shown in FIG. 9B, item 622 may be transitioned to a horizontal edge of display area 210 and then removed from element 220, corresponding to the elastic transition motion of the borders of element 220.

In block 524, the selected next item of subject information 624 is transferred into element 220. For example, as shown in FIG. 9B, item 624 may be transitioned from a horizontal edge of display area 210 into a center portion of element 220, corresponding to the elastic transition motion of the borders of element 220. In block 526, the next item of subject information is designated as the first item of subject information, in order that the loop may be repeated if desired (see block 528).

In block 528, a determination is made whether a next item of subject information should be transitioned in to element 220. For example, process 500 may be configured such that a next item of subject information is transitioned into element 220 only if a further selection (e.g., a physical contact and horizontal swiping motion) of element 220 is detected. Alternatively, process 500 may be configured to continue transitioning next items of subject information until a further selection (e.g., a physical tapping) of element 220 is detected. In another embodiment, next items of subject information may be transferred into element 220 until all items of subject information that have been updated over a certain time period or since a previous event (e.g., a last elastic transition) have been transitioned into element 220.

If it is determined that a next item of subject information should be transitioned into element 220, loop 520-526 is repeated. If, on the other hand, it is determined that no further items of subject information should be transitioned into element 220 at this time, the elastic transition motion of border 612 of element 220 is ceased, and a steady-state element border (e.g., border 614 of FIG. 9C) is maintained.

In another embodiment shown in FIG. 9D, element 220 may be configured to display multiple items of subject information 652, 654, 656, 658. As shown in FIGS. 9E and 9F, in response to a user selection, multiple additional items of subject information 660, 662, 664, 668 may be transitioned into item 220 in accordance with process 500. Process 900 may include transitioning all of items 652-658 out of element 220 in a single transition (i.e., a single iteration of loop 520-526), or may include transitioning out a single item (e.g., item 652) and transitioning in a single item (e.g., item 660) for each transition.

Figure 10:
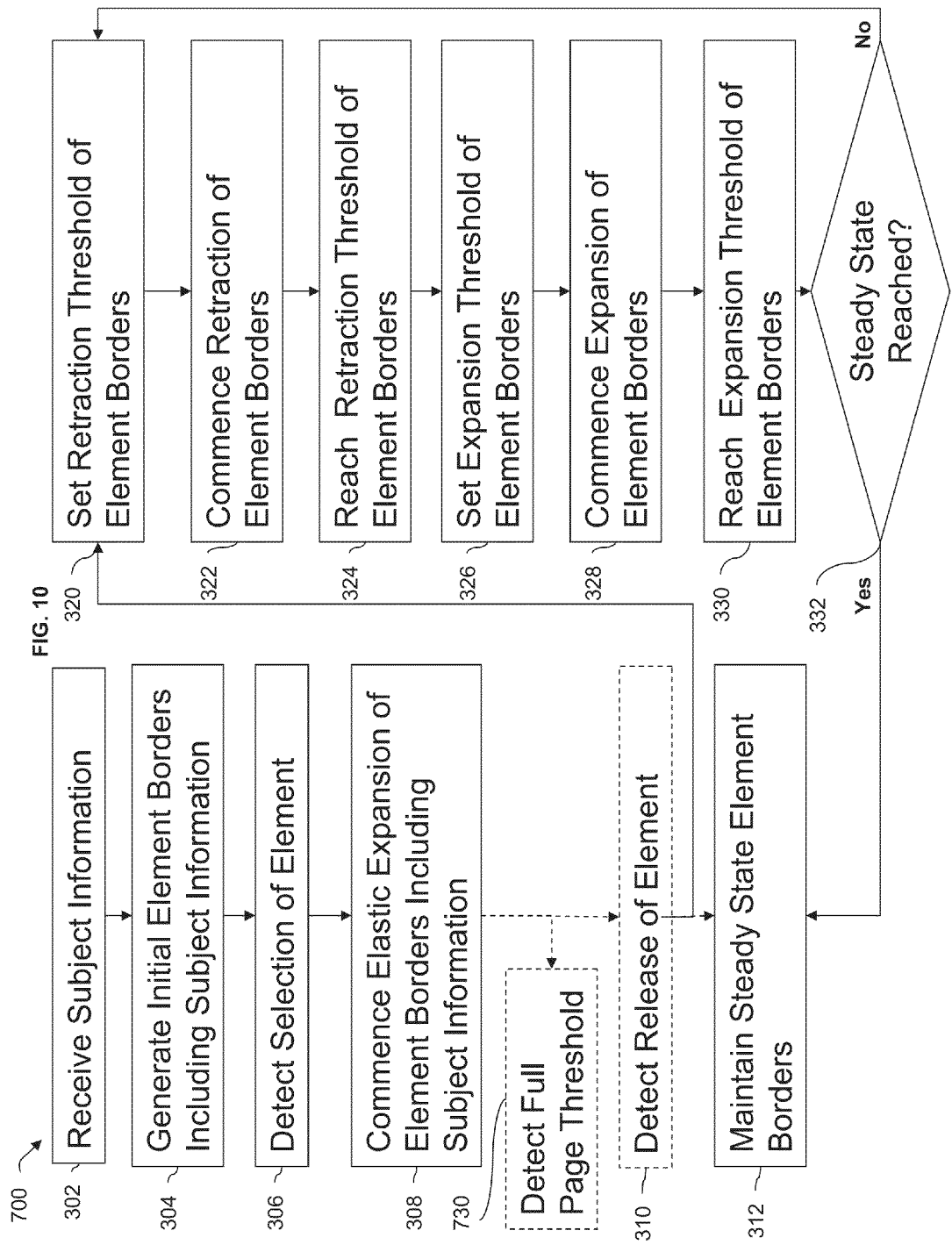
FIG. 10 is a flow chart showing a process for expanding an element in a user interface, in accordance with embodiments described herein.

FIG. 10 is a flow chart showing another embodiment of a process 700 for performing an elastic expansion of an element 220. FIGS. 11A-11D illustrate an elastic expansion of an element 220 in accordance with process 700.

Process 700 includes blocks 302-308, blocks 310-312, and blocks 320-332 that include substantially the acts described in connection with blocks having corresponding reference numbers in process 300 (FIG. 4). Accordingly, specific aspects of blocks 302-308, 310-312, and 320-332 of process 700 will not be repeated here.

At block 730, process 700 also includes a detection of whether an elastic expansion of element 220 has exceeded a full-page threshold, such that element 220 and the item of subject information 242 displayed therein should be expanded to occupy substantially an entire portion of display area 210. The full-page threshold 820 (FIG. 11C) may be determined by the operating system or the relevant application.

Figure 11B:
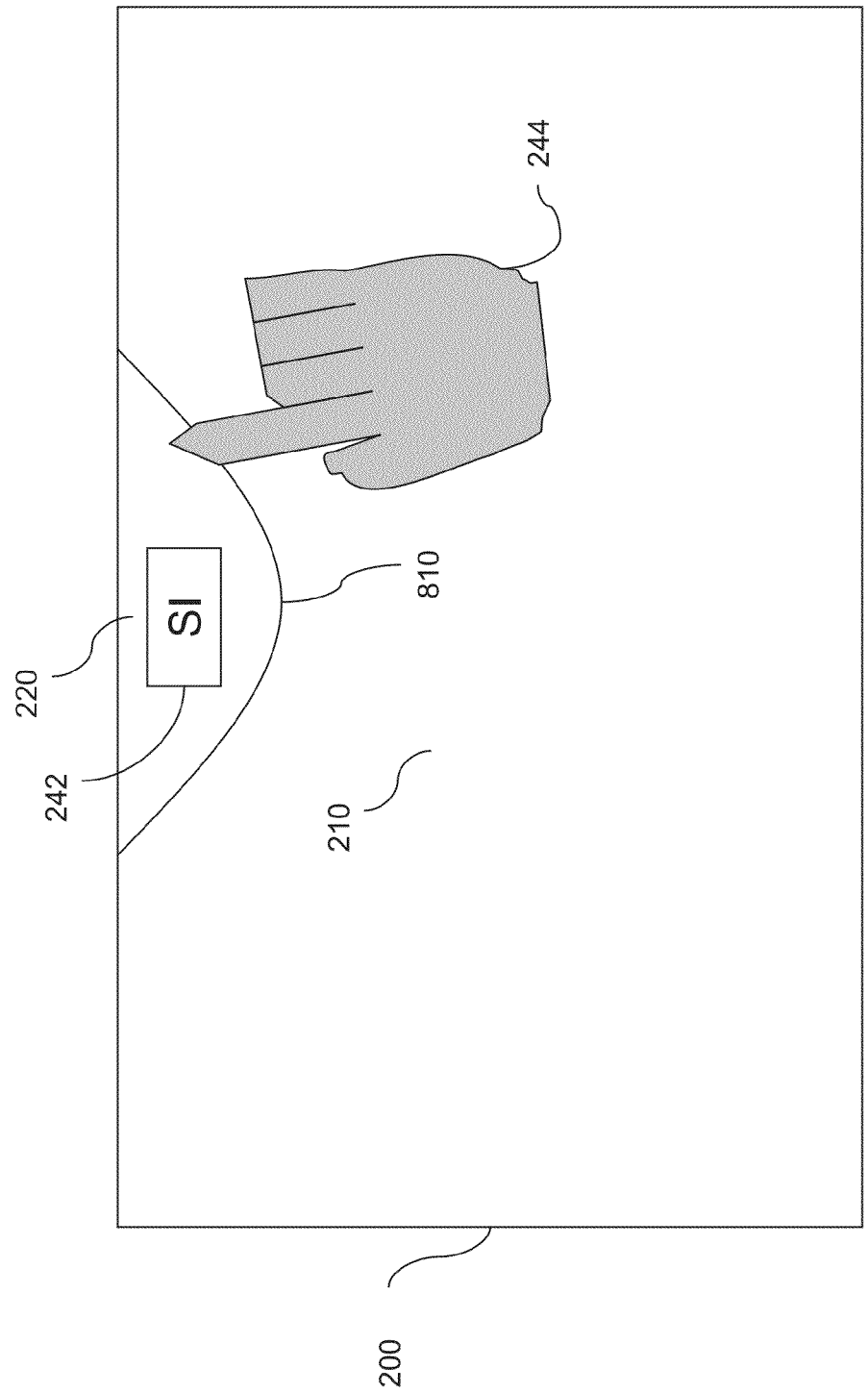

As shown in FIGS. 11A-11C, in block 308, element 220 is expanded from a steady-state border 810 across intermediate thresholds 812, 814, 816, 818 in a similar manner as described in connection with process 300. If the expansion of element 220 exceeds full-page threshold 620 prior to detecting a release of element 220 (e.g., in the non-limiting example of a selection that includes a physical contact and downward pulling motion on a portion of a touch screen corresponding to some portion of element 220, when the magnitude of the downward pulling motion exceeds full-page threshold 620 prior to detecting a removal of the physical contact), then element 220 and item 242 are expanded (e.g., maximized) to occupy substantially an entire portion of display area 210, as shown in FIG. 11D. A steady-state border 822 of element 220 may be maintained until another action (such as another selection) of element 220 is detected.

FIG. 12 is a flow chart showing a process 900 for removing an element 220 from display 200. FIGS. 13A-13D illustrate a display 200 of an electronic device, including an example of an element 220 that is removed from a display area 210 in accordance with process 900.

In block 902, element 220 is generated in display area 210. As shown in FIG. 13A, element 220 may include one or more items of subject information 242, and a steady-state border 910.

Figure 13C:
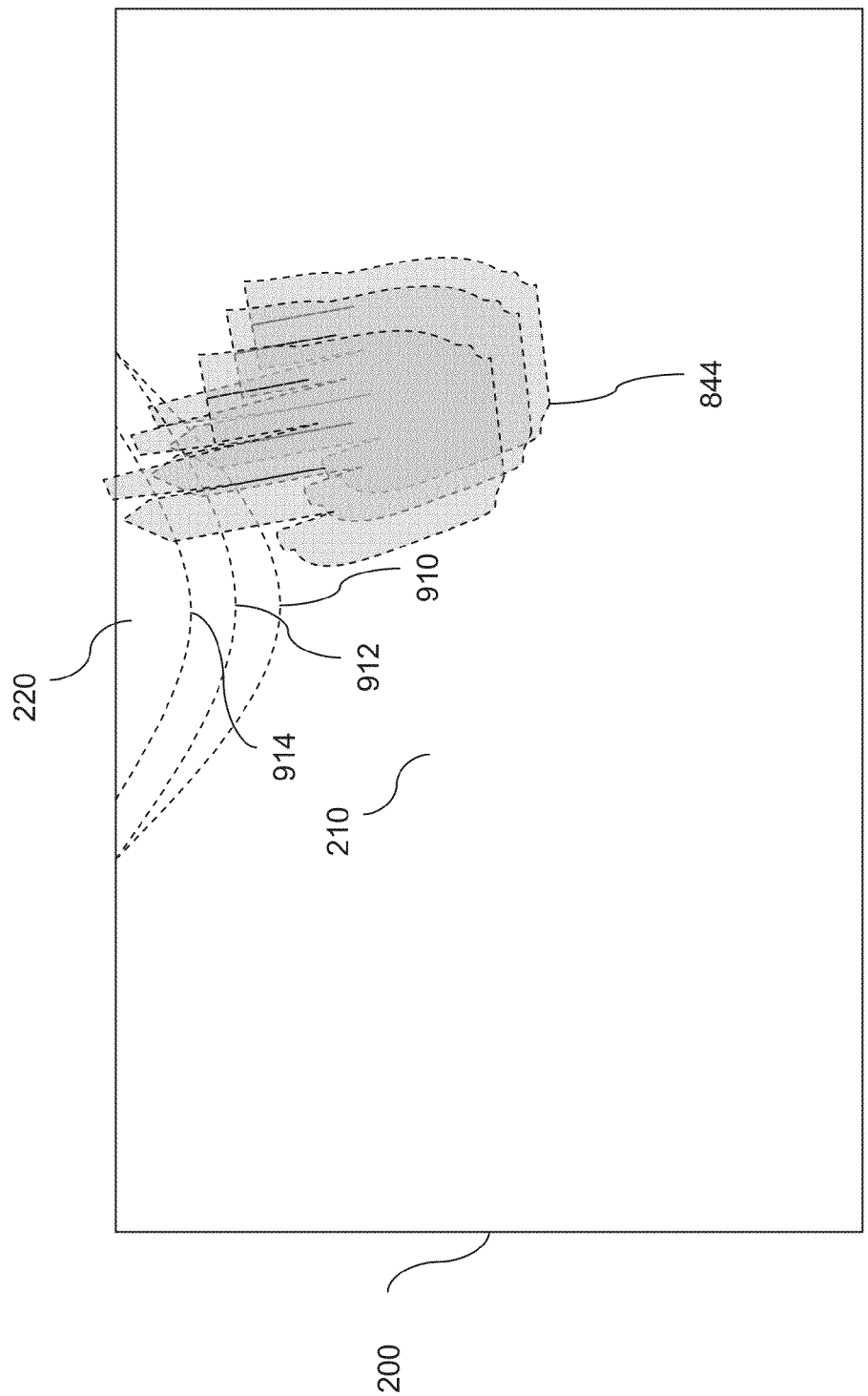

In block 904, a selection of element 220 is detected. The selection of element 220 may be a selection by a user of the electronic device, such as physical contact on a position of a touch screen electronic display that corresponds to the location of element 220 on the user interface, or the positioning of a cursor or other selection device over the position in which element 220 is displayed on the user interface. In one non-limiting example, as shown in FIGS. 13B and 13C, removal of element 220 is performed in response to detecting a physical contact (e.g., a touch by two fingers of a user 844 or a stylus) and upward pushing (i.e., swiping) motion on a portion of a touch screen corresponding to some portion of element 220. In another non-limiting example, removal of element 220 may be performed in response to detecting a tapping (e.g., one or multiple touches by one or more fingers 844 or a stylus) on a portion of the touch screen corresponding to some portion of element 220.

Figure 13D:
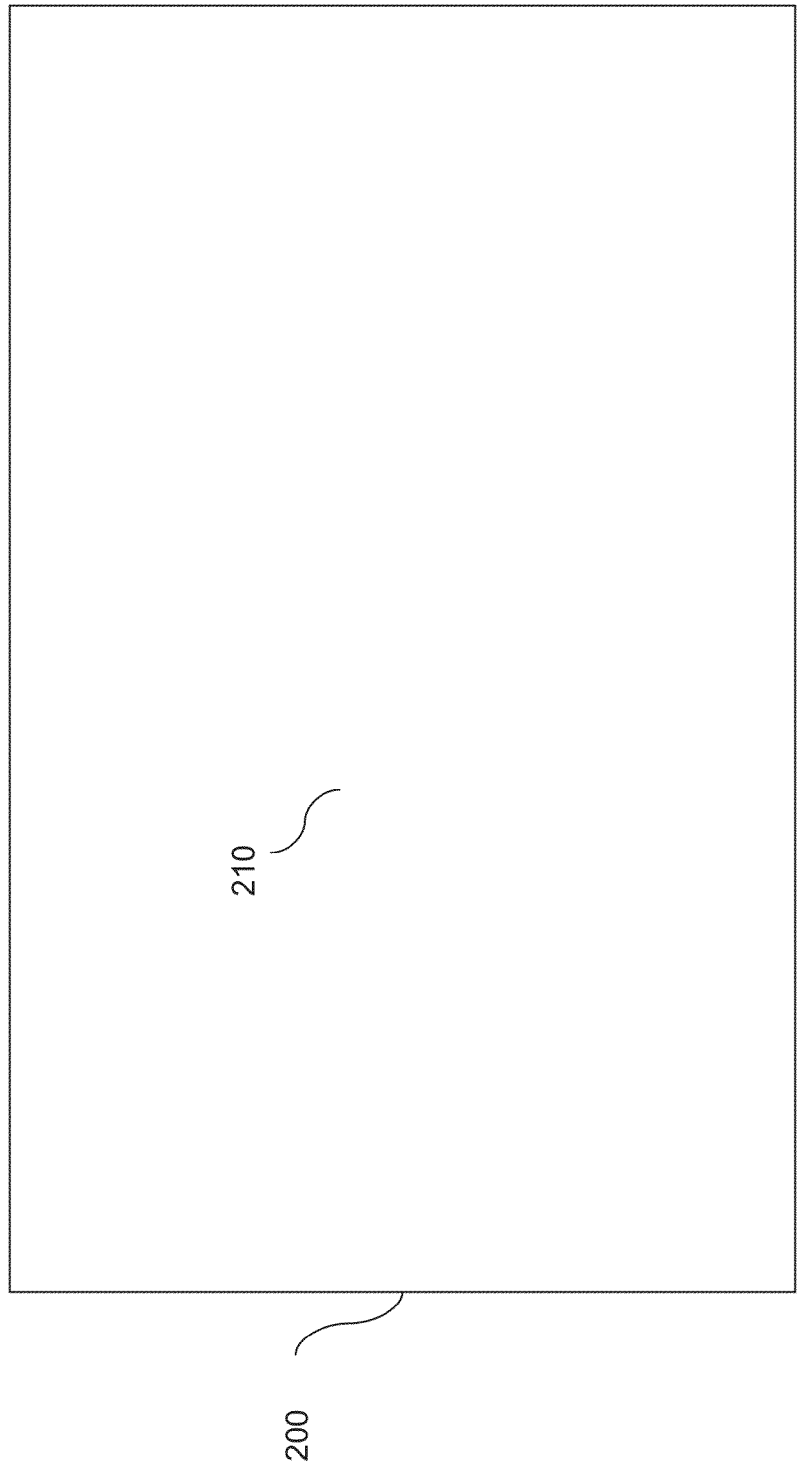

In block 906, in response to detecting the user selection, a retraction of the borders of element 220 is commenced. For example, as shown in FIG. 13C, the borders of element 220 may be retracted through intermediate thresholds 910, 912, 914, until element 220 is substantially retracted to a minimal size. In another embodiment, an item of subject information 242 displayed in element 220 may also be subjected to a retraction of its borders commensurate with the retraction of element 220. In another embodiment, an item of subject information 242 displayed in element 220 may be removed without retraction. In block 908, the removal of element 220 is complete, as shown in FIG. 13D.

Figure 14:
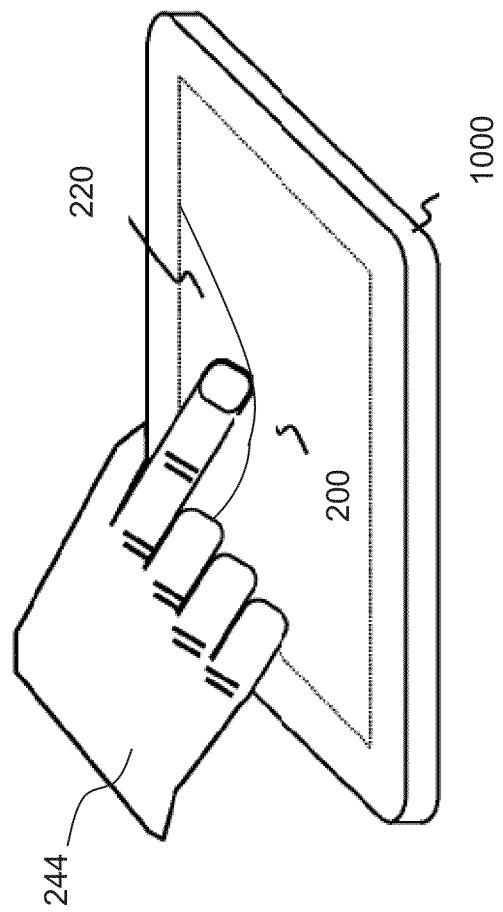
FIG. 14 illustrates an electronic device including a display, in accordance with embodiments described herein.

FIG. 14 illustrates an electronic device 1000 including a display 200. Electronic device 1000 may represent, for example, a tablet, laptop computer, desktop computer, cellular telephone, personal digital assistant (PDA), portable internet device, portable music player, portable navigation device, or handheld gaming device. Electronic device 1000 includes one or more instances of a processor readable medium, such as an electronic circuit, a semiconductor memory device, a read-only memory (ROM), a flash memory or other non-volatile memory, a floppy diskette, a CD-ROM, an optical disk, a hard disk, or other suitable types of memory known in the art, etc. Electronic device 1000 may be configured to operate according to an operating system, such as a version of Android, Windows, DOS, Mac OS or OS/2, Unix, Linux, Palm OS, etc. Electronic device 1000 also includes one or more processors, such as a central processing unit (CPU), configured to execute instructions stored on one or more of the computer readable storage mediums and/or received from various input/output devices.

Display 200 of electronic device 1000 may include an electronic display, such as an LED or LCD display, and a touch screen overlaying the electronic display, such as a resistive, capacitive, infrared, and surface acoustic wave (SAW) touch screen. The electronic display is configured to present graphical and/or textual information, and the touch screen is configured to recognize physical contact (such as from a stylus or finger 244) and the position of the contact on the display screen.

The one or more processors of electronic device 1000 are configured to receive signals from the touch screen and one or more other input/output devices, interpret the received signals, execute code segments from the operating system and/or from applications, and perform an action based thereon. In addition, electronic device includes an imaging circuit connected to the processor, such as a graphical memory control hub, for rendering one or more graphical images to the electronic display. For example, the imaging circuitry of electronic device 1000 may be configured to provide a graphical user interface on display 200. The one or more processors and imaging circuit of electronic device 1000 is also configured to render one or more user interface elements 220 that can be generated, expanded, transitioned, and/or removed in accordance with one or more of processes 10, 100, 300, 400, 500, 700, and 900 described above. Executable code configured to provide the graphical user interface and user interface element 220 may be part of an operating system, an application, or a combination thereof stored on a processor readable medium of electronic device 1000.

While this disclosure has been particularly shown and described with references to exemplary embodiments thereof, it will be understood by those skilled in the art that various changes in form and details may be made therein without departing from the scope of the embodiments encompassed by the appended claims.

What is claimed is:

1. A method for providing a user interface, the method comprising:
   generating, on an electronic device comprising an electronic display and in response to the electronic device detecting subject information, a user interface element on the electronic display;
   performing, upon first initially displaying the user interface element, without the user interacting with the user interface element, an elastic expansion of at least one border of said user interface element,
      wherein said elastic expansion comprises expanding said at least one border to a first position and retracting said at least one border to a second position while implementing the initial display such that
         a transition appears, to a user, on the electronic display that the at least one border is bouncing between the first position and the second position as the user interface element is first initially displayed over a portion of and less than all of the electronic display and
         without the user interacting with the user interface element; and
   populating said user interface element with at least one item of the subject information,
      wherein the populating said user interface element with the at least one item of the subject information comprises
         populating said user interface element with the at least one item of the subject information after an elastic expansion reaches a peak threshold.

2. The method of claim 1,
   wherein said act of generating a user interface element comprises generating initial borders of said user interface element, and
   wherein said act of performing an elastic expansion further comprises:
   expanding at least one border of said user interface element to said first position, wherein said first position is indicated by a first expansion threshold;
   retracting said at least one border to said second position, wherein said second position is indicated by a first retraction threshold;
   expanding said at least one border of said user interface element to a third position, wherein said third position is indicated by a second expansion threshold; and
   retracting said at least one border of said user interface element to a fourth position, wherein said fourth position is indicated by a second retraction threshold.

3. The method of claim 1 wherein said user interface element is populated with said at least one item of the subject information during said elastic expansion of said at least one border after the elastic expansion reaches a peak threshold.

4. The method of claim 1, said method further comprising:
   transitioning the at least one item of the subject information from said user interface element, wherein said act of transitioning comprises:
   commencing an elastic transition motion of at least one border of said user interface element;
   transitioning out said at least one item of the subject information from said user interface element;
   transitioning in at least one next item of the subject information to said user interface element; and
   ceasing said elastic transition motion of said at least one border.

5. The method of claim 4, wherein said elastic transition motion is a wavelike motion.

6. The method of claim 4, wherein said act of transitioning said at least one item of the subject information is performed in response to a selection of said element.

7. The method of claim 1 further comprises:
   detecting a selection of said user interface element; and
   performing an additional elastic expansion of one or more borders of said user interface element in response to said detection.

8. The method of claim 7, wherein said act of detecting a selection comprises detecting a user selection.

9. The method of claim 7, wherein said user interface is a graphical user interface provided on an electronic device including a touch screen, and wherein said act of detecting a selection comprises detecting a contact on said touch screen.

10. The method of claim 9 further comprises:
    expanding at least one border of said user interface element to said first position, wherein said first position is determined according to characteristics of said detected contact;
    detecting a release of said contact with said touch screen;
    retracting said at least one border to said second position after said act of detecting a release of said contact, wherein said second position is indicated by a first retraction threshold;
    expanding said at least one border of said user interface element to a third position, wherein said third position is indicated by a second expansion threshold; and
    retracting said at least one border of said user interface element to a fourth position, wherein said fourth position is indicated by a second retraction threshold.

11. The method of claim 10,
    wherein said user interface element is populated with at least one item of the subject information, said method further comprising:
    performing an elastic expansion of said at least one item of the subject information, wherein said elastic expansion comprises expanding at least one border of said item to a first position and retracting said at least one border of said item to a second position.

12. The method of claim 11, wherein said act of performing an elastic expansion of said at least one item of the subject information further comprises:
    expanding at least one border of said item to said first position, wherein said first position is determined according to characteristics of said detected contact;
    retracting said at least one border to said second position after said act of detecting a release of said contact, wherein said first position is indicated by a first retraction threshold;
    expanding said at least one border of said item to a third position indicated by a second expansion threshold; and
    retracting said at least one border of said item to a fourth position indicated by a second retraction threshold.

13. A computer program product stored on non-transitory, processor readable medium, the computer program product comprising executable code configured to:
    generate, on an electronic device comprising an electronic display and in response to the electronic device detecting subject information,
    a user interface element on the electronic display; and
    perform, upon first initially displaying the user interface element, without the user interacting with the user interface element, an elastic expansion of at least one border of said user interface element, wherein said elastic expansion comprises expanding said at least one border to a first position and retracting said at least one border to a second position while implementing the initial display such that
a transition appears, to a user, on the electronic display that the at least one border is bouncing between the first position and the second position as the user interface element is first initially displayed over a portion of and less than all of the electronic display and
without the user interacting with the user interface element; and populate said user interface element with at least one item of the subject information,
wherein the populating said user interface element with the at least one item of the subject information comprises
populating said user interface element with the at least one item of the subject information after an elastic expansion reaches a peak threshold.

14. The computer program product of claim 13, wherein said act of generating a user interface element comprises generating initial borders of said user interface element, and wherein said act of performing an elastic expansion further comprises:
expanding at least one border of said user interface element to said first position, wherein said first position is indicated by a first expansion threshold;
retracting said at least one border to said second position, wherein said second position is indicated by a first retraction threshold;
expanding said at least one border of said user interface element to a third position, wherein said third position is indicated by a second expansion threshold; and
retracting said at least one border of said user interface element to a fourth position, wherein said fourth position is indicated by a second retraction threshold.

15. The computer program product of claim 13, the computer program product further comprising executable code configured to populate said user interface element with at least one item of the subject information.

16. The computer program product of claim 15, the computer program product further comprising executable code configured to:
transition the at least one item of the subject information from said user interface element, wherein said act of transitioning comprises:
commencing an elastic transition motion of at least one border of said user interface element;
transitioning out said at least one item of the subject information from said user interface element;
transitioning in at least one next item of the subject information to said user interface element; and
ceasing said elastic transition motion of said at least one border.

17. The computer program product of claim 13, wherein said electronic display comprises a touch screen, and further comprises:
detecting a selection of said user interface element, wherein said selection comprises a contact with said touch screen; and
performing said elastic expansion of said at least one border of said user interface element in response to said detection.

18. The computer program product of claim 17 further comprises:
expanding at least one border of said user interface element to said first position, wherein said first position is determined according to characteristics of said detected contact;
detecting a release of said contact with said touch screen;
retracting said at least one border to said second position after said act of detecting a release of said contact, wherein said second position is indicated by a first retraction threshold;
expanding said at least one border of said user interface element to a third position, wherein said third position is indicated by a second expansion threshold; and
retracting said at least one border of said user interface element to a fourth position, wherein said fourth position is indicated by a second retraction threshold.

19. The computer program product of claim 13, wherein said computer program product comprises an operating system.

20. The computer program product of claim 13, wherein said computer program product comprises an application.

21. An apparatus comprising:
an electronic display;
a rendering circuit configured to render graphics onto the electronic display; and
a processor coupled to the rendering circuit, wherein the processor is configured to provide,
in response to the processor detecting subject information, a user interface for said electronic display, wherein said user interface comprises at least one user interface element, and wherein said processor is configured to control said user interface to
perform, upon first initially displaying the user interface element, without the user interacting with the user interface element, an elastic expansion of at least one border of said user interface element,
wherein said elastic expansion comprises expanding said at least one border to a first position and retracting said at least one border to a second position while initially displaying said user interface element such that
a transition appears, to a user, on the electronic display that the at least one border is bouncing between the first position and the second position as the user interface element is first initially displayed over a portion of and less than all of the electronic display and
without the user interacting with the user interface element; and
populate said user interface element with at least one item of the subject information,
wherein the populating said user interface element with the at least one item of the subject information comprises
populating said user interface element with the at least one item of the subject information after an elastic expansion reaches a peak threshold.

22. The apparatus of claim 21, said apparatus further comprising a touch screen overlaying said electronic display and configured to detect a physical contact and position thereof on the electronic display.

23. The apparatus of claim 22, wherein said touch screen comprises one of a resistive, capacitive, infrared, and surface acoustic wave (SAW) touch screen.

24. The apparatus of claim 21, wherein said apparatus comprises a handheld device.

25. The apparatus of claim 22, wherein said processor is configured to control said user interface to:

expand at least one border of said user interface element to said first position, wherein said first position is determined according to characteristics of a detected physical contact on said electronic display;

detect a release of said physical contact;

retract said at least one border to said second position after detecting said release of said physical contact, wherein said second position is indicated by a first retraction threshold;

expand said at least one border of said user interface element to a third position, wherein said third position is indicated by a second expansion threshold; and retract said at least one border of said user interface element to a fourth position, wherein said fourth position is indicated by a second retraction threshold.

26. The apparatus of claim 25, wherein said characteristics of said detected physical contact on said electronic display comprise at least one of:

a position of said physical contact on said electronic display;

a direction of movement of said physical contact on said electronic display; and a magnitude of said physical contact on said electronic display.

* * * * *